(12) United States Patent
Herb

(10) Patent No.: US 10,396,631 B2
(45) Date of Patent: Aug. 27, 2019

(54) DUAL INVERTER AND ELECTRIC MOTOR SPLIT-FLOW COOLING SYSTEM

(71) Applicant: NIO USA, Inc., San Jose, CA (US)

(72) Inventor: Robert Herb, Morgan Hill, CA (US)

(73) Assignee: NIO USA, Inc., San Jose, CA (US)

( * ) Notice: Subject to any disclaimer, the term of this patent is extended or adjusted under 35 U.S.C. 154(b) by 44 days.

(21) Appl. No.: 15/799,376

(22) Filed: Oct. 31, 2017

(65) Prior Publication Data

US 2019/0131851 A1    May 2, 2019

(51) Int. Cl.
| | |
|---|---|
| H02K 9/00 | (2006.01) |
| H02K 9/197 | (2006.01) |
| H02K 5/20 | (2006.01) |
| H02K 11/33 | (2016.01) |

(52) U.S. Cl.
CPC .............. *H02K 9/197* (2013.01); *H02K 5/20* (2013.01); *H02K 11/33* (2016.01)

(58) Field of Classification Search
CPC ........... H02K 9/197; H02K 11/33; H02K 5/20
See application file for complete search history.

(56) References Cited

U.S. PATENT DOCUMENTS

| | | | | |
|---|---|---|---|---|
| 6,201,365 B1 * | 3/2001 | Hara | ........................ | B60K 6/26 318/558 |
| 6,323,613 B1 * | 11/2001 | Hara | ...................... | H02K 11/33 318/471 |
| 7,530,420 B2 | 5/2009 | Davis et al. | | |
| 8,148,859 B2 * | 4/2012 | Yoshida | .................... | H02K 5/20 310/52 |
| 9,487,092 B2 * | 11/2016 | Yamada | .............. | H02M 3/1584 |
| 2009/0020081 A1 | 1/2009 | Claypole et al. | | |
| 2010/0218916 A1 | 9/2010 | Miller et al. | | |
| 2012/0153718 A1 | 6/2012 | Rawlinson et al. | | |
| 2016/0039277 A1 | 2/2016 | Falls et al. | | |
| 2018/0339583 A1 * | 11/2018 | Hirai | ........................ | B60K 1/02 |
| 2019/0061504 A1 | 2/2019 | Bassis | | |

FOREIGN PATENT DOCUMENTS

| | | |
|---|---|---|
| CN | 103237673 | 8/2013 |
| CN | 103786568 | 5/2014 |
| CN | 104967250 | 10/2015 |
| CN | 205632080 U | 10/2016 |
| WO | WO 2007/118082 | 10/2007 |

OTHER PUBLICATIONS

U.S. Appl. No. 15/841,080, filed Dec. 13, 2007, Bassis.

* cited by examiner

*Primary Examiner* — Thanh Lam
(74) *Attorney, Agent, or Firm* — Sheridan Ross P.C.

(57) ABSTRACT

A split-flow coolant system is provided. The split-flow coolant system may include a single inlet and multiple coolant distribution channels arranged inside a housing, or cooling plate, of the inverter. The coolant distribution channels may include a coolant chamber connected to the inlet and a coolant path running adjacent to various portions of the inverter. The coolant chamber splits into two separate coolant paths in the inverter housing, or cooling plate, that are then diverted to each of the motors. A first coolant path is diverted to the first motor where the coolant path is arranged to cool the first motor and a second coolant path is diverted to the second motor to cool the second motor. The separate coolant paths may connect to a common outlet at the end of the cooling path for the motors.

20 Claims, 11 Drawing Sheets

DUAL INVERTER AND ELECTRIC MOTOR SPLIT-FLOW COOLING SYSTEM

FIELD

The present disclosure is generally directed to vehicle powertrain cooling systems, in particular, toward electric and/or hybrid-electric vehicle inverter and motor cooling systems.

BACKGROUND

Most internal combustion engines rely on transmissions to provide optimal torque and vehicle speeds over a range of operating conditions. In contrast, electric vehicles, employing one or more electric motors, have a wide torque band capable of providing maximum torque output at low or high revolutions per minute (rpm). While some electric vehicles may include a multiple speed gearbox, the components of the transmission are generally designed to match the rpm of the electric motor to that of the drive wheels. Electric motors typically include an inverter configured to convert direct current (DC) electricity provided from a battery, or other DC power source, into alternating current (AC) electricity that may drive the electric motor and vehicle. The electric motor and inverter are part of the powertrain of an electric vehicle.

As the components of an electric drive system work by converting electrical energy into mechanical energy, and vice versa, the electric motor and inverter can generate significant heat. Adequately controlling the operating temperatures of the electric drive system is critical to maintaining the integrity and longevity of the electric motors and inverters. Today, vehicles employing two-motor systems typically have two completely different sets of cooling systems, including separate inverters (e.g., one inverter for each motor) and separate cooling systems for each motor/inverter in the vehicle.

DETAILED DESCRIPTION

Figure 1:
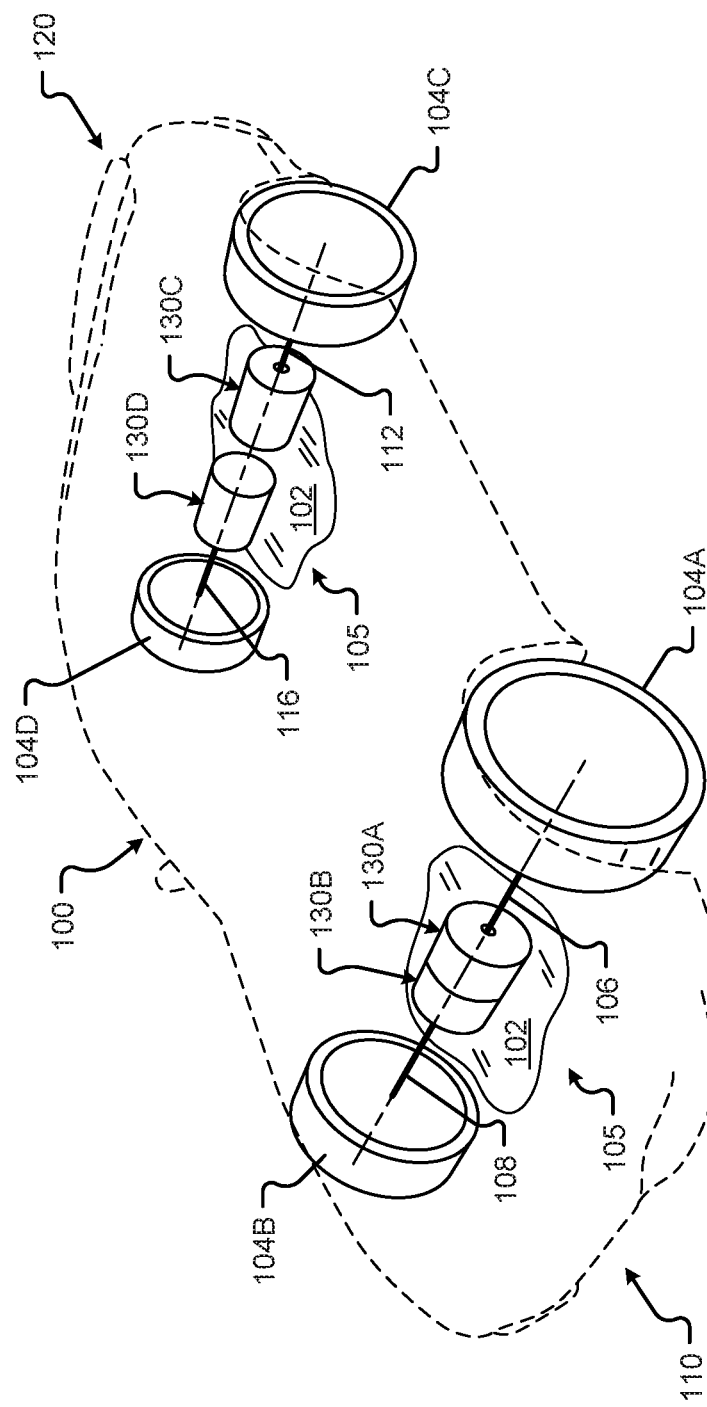
FIG. 1 shows a schematic perspective view of a vehicle powertrain in accordance with embodiments of the present disclosure.

Embodiments of the present disclosure will be described in connection with a vehicle, and in some embodiments, an electric vehicle, rechargeable electric vehicle, and/or hybrid-electric vehicle and associated systems. In some embodiments, the present disclosure provides a coolant flow arrangement for a two-motor design (e.g., where one microcontroller runs two motors) and an inverter is disposed above, on the top of, below, or on the bottom the motors.

As described herein, the split-flow coolant system may include a single inlet and multiple coolant distribution channels arranged inside the housing, or cooling plate, of the inverter. The coolant distribution channels may include a coolant chamber connected to the inlet and a coolant path running adjacent to various portions of the inverter. In some embodiments, the coolant chamber splits into two separate coolant paths in the inverter housing, or cooling plate, that are then diverted to each of the motors. For instance, a first coolant path is diverted to the first motor where the coolant path is arranged to cool the first motor and a second coolant path is diverted to the second motor to cool the second motor. The separate coolant paths may connect to a common outlet at the end of the cooling path for the motors.

In one embodiment, as the coolant flows through the inverter housing (cooling the inverter), the coolant may fork along the separate coolant paths, diverting into each of the two motor housings cooling each motor with a separate but fluidly interconnected coolant path. From the motors, the coolant may be routed or directed to a thermal management system of the vehicle.

At least one advantage to the split-flow system is that the coolant flow is split and maintained inside a single physically integrated system. Moreover, since the inverter may be arranged on top or on the bottom of the motors, the cooling system can be integrated into the system housing providing cooling directly from the inverter as well as each of the coolant paths (e.g., separate housings for the motors and inverter are not required and that would otherwise impede direct cooling of each motor). With this integrated approach, no hoses are required to connect the inverter coolant system with the motor coolant system.

Among other things, the split-flow coolant system described herein may provide a number of advantages and benefits over conventional inverter motor cooling systems. For instance, the split-flow coolant system allows for multiple motors and an associated inverter to be cooled by a single cooling system, saving component costs, maintenance costs, and separate system thermal management. In addition, the split-flow coolant system offers the advantage of saving a number of complex assembly steps. In one embodiment, the inverter can be bolted directly onto the motors, or motor housings, where each cooling outlet of the inverter fits with the cooling inlet for each the respective motor. In some embodiments, the inverter and motor housing may be manufactured as a single piece. It should be appreciated that the design of the split-flow coolant system (e.g., integrated housing or separate cooling components, etc.) may be based on whether the system is integrated with existing parts or if a custom motor/inverter cooling system is made together. For example, if a motor supplier makes an existing standard motor housing, then the split-flow cooling system may be bolted onto the existing motor. However, if the housing is cast, then the split-flow cooling system may be manufactured as one elegant integrated component.

FIG. 1 shows a perspective view of a vehicle powertrain 105 in accordance with embodiments of the present disclosure. The vehicle powertrain 105 may be part of an electric vehicle 100. The vehicle 100 may comprise a vehicle frame 102, vehicle front 110, vehicle aft 120, vehicle roof, at least one vehicle side, a vehicle undercarriage, and a vehicle interior. In some embodiments, the frame 102 may include one or more body panels mounted or affixed thereto. The vehicle 100 may include one or more interior components (e.g., components inside an interior space, or user space, of a vehicle 100, etc.), exterior components (e.g., components outside of the interior space, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The powertrain 105 may include one or more drive units 130A-D. The drive unit 130A-D may be configured to provide power to one or more wheels 104A-D of the vehicle 100 via at least one drive axle 106, 108, 112, 116. The drive units 130A-D may include an electric motor that is mechanically coupled with a gearbox. In some embodiments, the drive units 130A-D may include an inverter. The inverter may be configured to convert direct current (DC) electricity provided from a battery, or other DC power source, into alternating current (AC) electricity that may drive the electric motor of the drive unit 130A-D.

As shown in FIG. 1, the vehicle 100 may include at least one powertrain 105 located in various positions in the vehicle 100. For instance, the vehicle 100 may include a front drive system, a rear drive system, and/or both a front and rear drive system. In some embodiments, each drive wheel 104A-D may be powered by a separate drive unit 130A-D. In one embodiment, a single drive unit 130A-D may provide power to more than drive wheel 104A-D.

In the event that multiple drive units 130A-D are employed to provide power to the drive wheels 104A-D along the same drive axis, the drive units 130A-D may share a common, or unified, housing and interconnection to the vehicle frame 102. This unified housing configuration is schematically illustrated in the first and second drive units 130A, 130B driving first and second drive wheels 104A, 104B, via drive axles 106, 108, respectively. In some embodiments, separate and/or spaced apart multiple drive units 130C, 130D, having individual or separate housings, may be employed to provide power to the drive wheels 104C, 104D along the same drive axis. In this example, the third and fourth drive units 130C, 130D may drive third and fourth drive wheels 104C, 104D, via drive axles 112, 116, respectively.

In some embodiments, the drive unit 130A-D may be mounted to a portion of the vehicle 100 via one or more attachment points. For instance, the drive unit 130A-D may be interconnected with the vehicle chassis or frame 102 via a bolted connection, clamped connection, or other attachment. In one embodiment, the housing of the drive unit 130A-D may include one or more features configured to provide a removable connection to the frame 102 of the vehicle 100. These features can include, but are in no way limited to, one or more flanges, ledges, feet, pads, protrusions, bolt holes, apertures, studs, threaded holes, threaded rods, etc., and/or combinations thereof. In any event, the fixed interconnection of the drive unit 130A-D with the vehicle frame 102 can allow power to be efficiently transmitted from the motor through the gearbox and drive axles 108, 110, 112, 116 to one or more drive wheels 104A-D.

The frame 102 may comprise a separate frame and body construction (i.e., body-on-frame construction), a unitary frame and body construction (i.e., a unibody construction), or any other construction defining the structure of the vehicle 100. The frame 102 may be made from one or more materials including, but in no way limited to steel, titanium, aluminum, carbon fiber, plastic, polymers, etc., and/or combinations thereof. In some embodiments, the frame 102 may be formed, welded, fused, fastened, pressed, etc., combinations thereof, or otherwise shaped to define a physical structure and strength of the vehicle 100. In any event, the frame 102 may comprise one or more surfaces, connections, protrusions, cavities, mounting points, pads, tabs, slots, or other features that are configured to receive other components that make up the vehicle 100. For example, the body panels, powertrain, controls system, interior components, and/or safety elements may interconnect with, or attach to, the frame 102 of the vehicle 100.

In some embodiments, the frame 102 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources, motors, drive units 130A-D, safety equipment, controllers, user interfaces, interior and/or exterior components, body panels, bumpers, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 102 may include slides, receptacles, cavities, protrusions, and/or a number of other features that allow for quick exchange of system components. In one embodiment, the frame 102 may include tray or ledge features, mechanical interconnection features, locking mechanisms, retaining mechanisms, etc., and/or combinations thereof.

Figure 2:
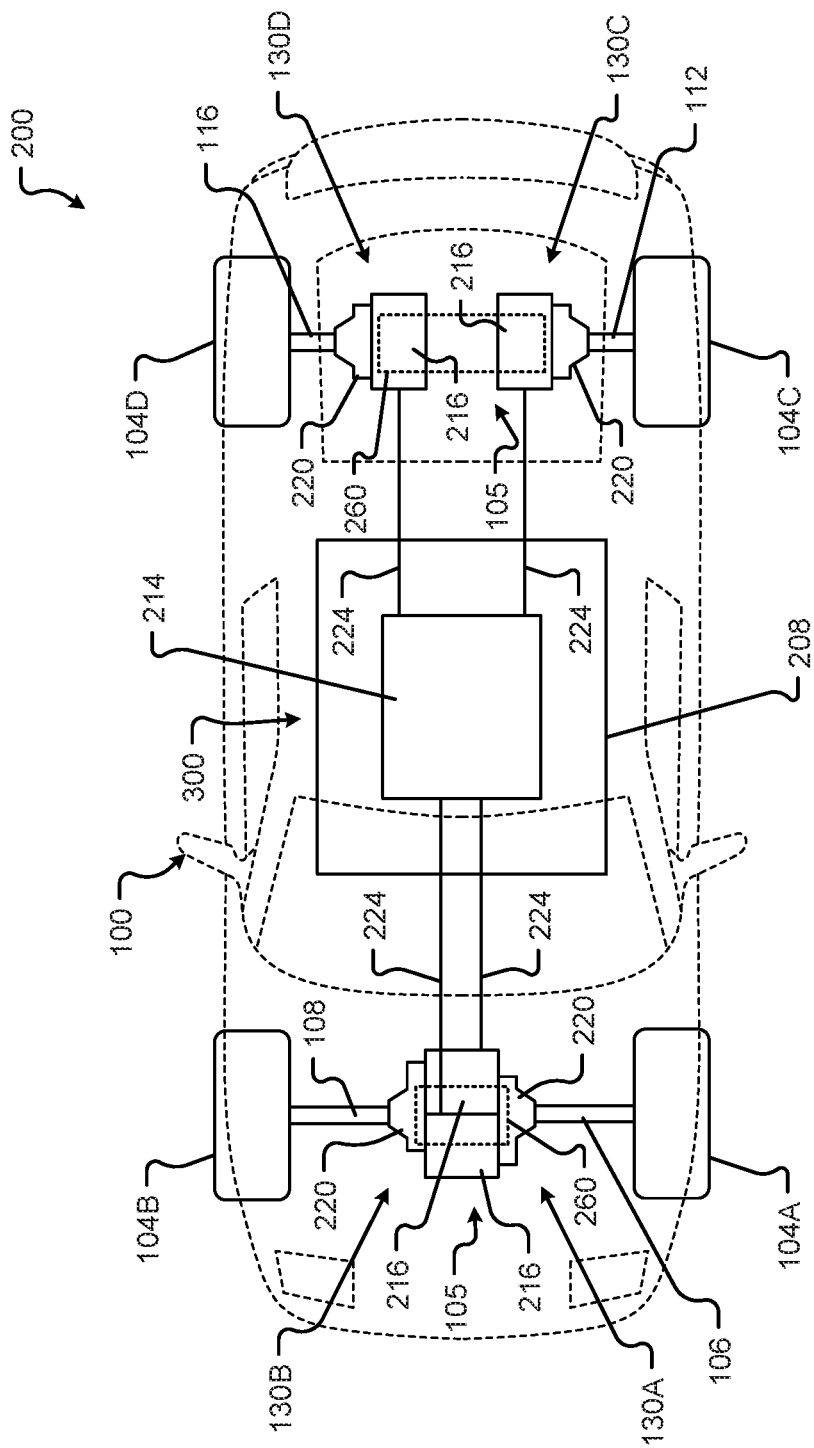
FIG. 2 shows a plan view of the vehicle powertrain in accordance with at least some embodiments of the present disclosure.

Referring now to FIG. 2, a plan view of the vehicle power system 200 will be described in accordance with embodiments of the present disclosure. The power system of the vehicle 100 may include the powertrain 105, power distribution system, accessory power system, and/or any, other components that store power, provide power, convert power, and/or distribute power to one or more portions of the vehicle 100. The powertrain 105 may include the one or more electric motors 216 of the vehicle 100. The electric motors 216 are configured to convert electrical energy provided by a power source 208 into mechanical energy. This mechanical energy may be in the form of a rotational or other output force that is configured to propel or otherwise provide a motive force for the vehicle 100 via at least one drive axle 106, 108, 112, 116 interconnected to at least one drive wheel 104A-D.

In some embodiments, the electric motors 216 may include an inverter 260. In one embodiment, dual electric motors 216 may be supplied by a single inverter 260 or by a dual inverter 260 (e.g., an inverter 260 including components capable of providing converted electricity to multiple motors 216, etc.). In any event, the inverter 260 may be disposed between the power source 208 and the electric motor 216. The inverter 260 may include one or more power controllers 214 as described herein.

In some embodiments, the vehicle 100 may include one or more drive wheels 104A-D that are driven by the one or more electric motors 216 via a gearbox 220 and drive axle 106, 108, 112, 116. In some embodiments, the electric motors 216 may include one or more of a motor controller, inverter, and/or an electrical interconnection to the power source 208. As provided above, the vehicle 100 may include an electric motor 216 configured to provide a driving force for each drive wheel 104A-D. In other cases, a single electric motor 216 may be configured to share an output force between two or more drive wheels 104A-D via one or more power transmission components, drive shafts, differentials, etc. It is an aspect of the present disclosure that the powertrain 105 may include one or more power transmission components, motor controllers, and/or power controllers 214 that can provide a controlled output of power to one or more of the drive wheels 104A-D of the vehicle 100. The power transmission components, power controllers 214, or motor controllers may be controlled by at least one other vehicle controller or computer system as described herein. In one embodiment, the power controller 214 may be part of the battery system or power source 208. In some embodiments, the power controller 214 may be separate from, but electrically interconnected with, the power source 208. In some embodiments, the power controller 214 may be part of the inverter.

As provided above, the powertrain 105 of the vehicle 100 may include one or more power source 208. The power source 208 may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208 may provide power to various systems of the vehicle 100. For instance, a drive power source may be configured to provide the power for the one or more electric motors 216 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208 in this manner may provide a number of benefits over conventional vehicle systems. For example, separating the power sources 208 can allow one of the power sources 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208 is depleted, removed, or becomes otherwise inoperable.

In some embodiments, the drive power source may be separated into two or more batteries, modules, cells, units, sources, and/or systems. By way of example, a vehicle 100 may include a first drive power source and a second drive power source. The first drive power source may be operated independently from or in conjunction with the second drive power source, and vice versa. Continuing this example, the first drive power source may be removed from a vehicle 100 while a second drive power source can be maintained in the vehicle 100 to provide drive power. This approach allows the vehicle 100 to significantly reduce weight (e.g., of the first drive power source, etc.) and improve power consumption, even if only for a temporary period of time.

The powertrain 105 includes one or more power distribution systems configured to transmit power from the power source 208 to one or more electric motors 216 in the vehicle 100. The power distribution system may include electrical interconnections 224 in the form of cables, wires, traces, wireless power transmission systems, contactors, relays, fuses, etc., and/or combinations thereof. It is an aspect of the present disclosure that the vehicle 100 include one or more redundant electrical interconnections to the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection is being used and/or damage has occurred to a particular area of the vehicle electrical system. In any event, the one or more redundant electrical interconnections may be configured along completely different routes than the electrical interconnections 224 shown and/or include different modes of failure than the electrical interconnections 224 to, among other things, prevent a total interruption power distribution in the event of a failure.

Figure 3:
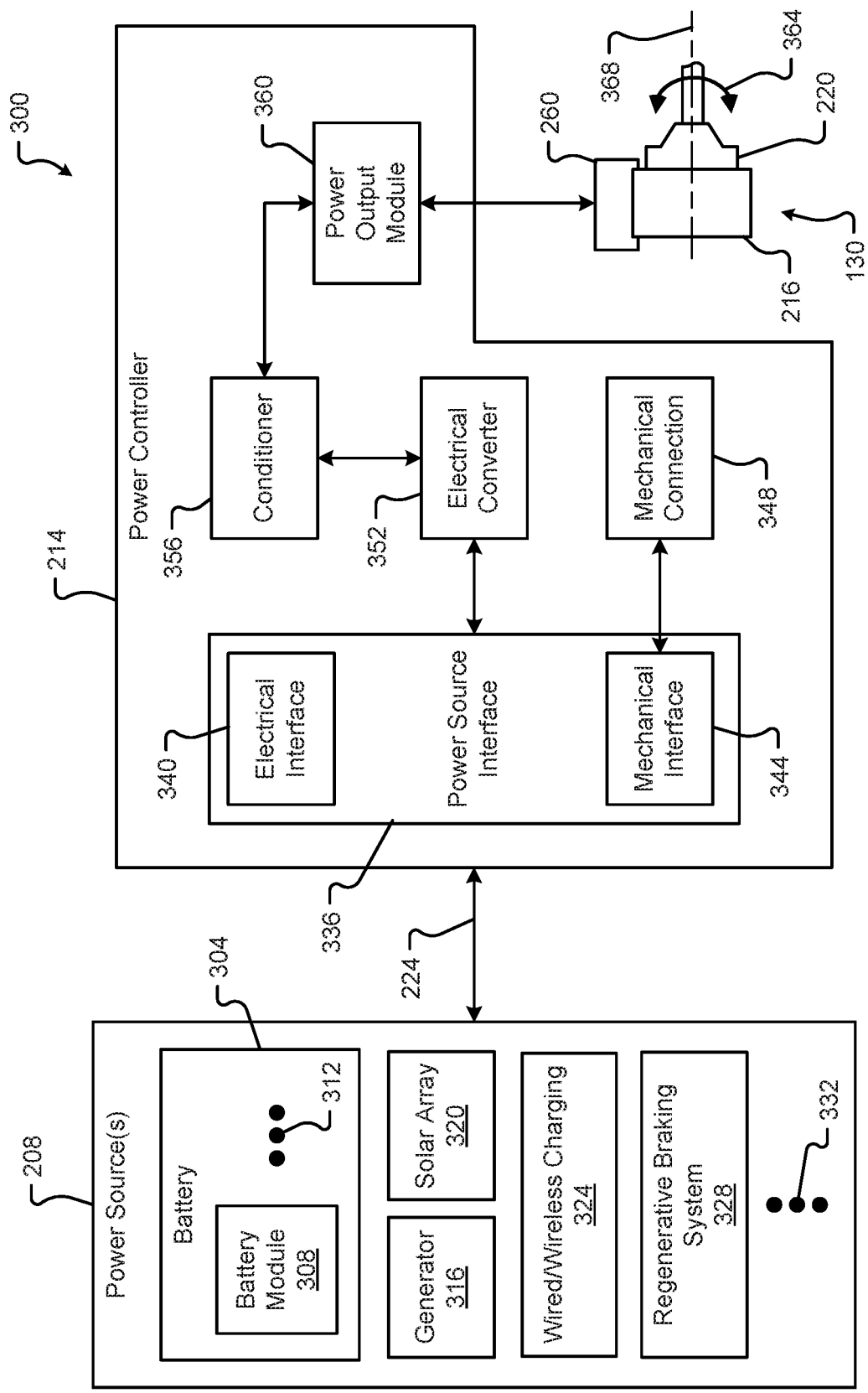
FIG. 3 is a block diagram of a power control system of the vehicle in accordance with embodiments of the present disclosure.

FIG. 3 shows a block diagram of a power control system 300 of the vehicle 100 in accordance with embodiments of the present disclosure. In particular, the power control system 300 may include a vehicle power source 208 electrically interconnected with the power controller 214. The vehicle may include at least one power source 208 that generates and/or stores power, and/or load(s) (e.g., inverters, motors 216, motor gearbox, or drive, units 130A-D, devices, systems, subsystems, etc.) that consume power. The power output from the power source 208 may be managed by a power controller 214. Further, the power control system 300 can include one or more other interfaces or controllers other than those shown in FIG. 3, The power controller 214 can be a computer or computing system(s) and/or electrical system with associated components, as described herein, capable of managing the power output module 360 to receive power, routing the power to and/or from the power source 208, and then providing the power from the power source 208 to at least one load (e.g., motor 216, inverter, drive unit 130, etc.). Thus, the power controller 214 may execute programming that controls switches, devices, components, etc. involved in the reception, storage, and provision of the power in the power control system 300.

The power sources 208 can include power sources internal and/or associated with the vehicle 100 and/or power sources external to the vehicle 100 to which the vehicle 100 electrically connects. In one embodiment, the power source 208 may include a battery 304. The battery 304 may include one or more battery modules 308, battery management systems, and/or other components 312. The battery 304 may be any type of battery for storing electrical energy, for example, a lithium ion battery, a lead acid battery, a nickel cadmium battery, etc. Further, the battery 304 may include different types of power storage systems, such as, ionic fluids or other types of fuel cell systems. The battery 304 may also include one or more high-capacity capacitors. The capacitors may be used for long-term or short-term storage of electrical energy. The input into the battery 304 or capacitor may be different from the output, and thus, the capacitor may be charged quickly but drain slowly. The functioning of the converter 352 and battery 304 capacitor may be monitored or managed by a charge management unit.

One of the internal power sources can include an on board generator 316. The generator 316 may be an AC generator, a direct current DC generator, or a self-excited generator. The AC generators can include induction generators, linear electric generators, and/or other types of generators. The DC generators can include homopolar generators and/or other types of generators. The generator 316 can be brushless or include brush contacts and generate the electric field with permanent magnets or through induction. The generator 316 may be mechanically coupled to a source of kinetic energy, such as an axle 106, 108, 112, 116 or some other power take-off. The generator 316 may also have another mechanical coupling to an exterior source of kinetic energy, for example, a wind turbine.

In some embodiments, a source of power internal to or associated with the vehicle 100, may be a solar array 320. The solar array 320 may include any system or device of one or more solar cells, or photovoltaics, mounted on the exterior of the vehicle 100 or integrated within the body panels of the vehicle 100 that provides or converts solar energy into electrical energy to provide power to the battery 304 and/or one or more battery modules 308.

Another power source 208 may include wired or wireless charging 324. The wireless charging system 324 may include inductive and/or resonant frequency inductive charging systems that can include coils, frequency generators, controllers, etc. The wireless charging system 324 may include capacitive charging systems that can include capacitors, frequency generators, controllers, etc. Wired charging may be any kind of grid-connected charging that has a physical connection, although, the wireless charging may be grid connected through a wireless interface. The wired charging system 324 can include connectors, wired interconnections, the controllers, etc. The wired and wireless charging systems 324 can provide power to the battery 304 and/or one or more battery modules 308 from external power sources.

Internal sources for power may include a regenerative braking system 328. The regenerative braking system 328 can convert the kinetic energy of the moving vehicle into electrical energy through a generation system mounted within the wheels, axle, and/or braking system of the vehicle 100. The regenerative braking system 328 can include any coils, magnets, electrical interconnections, converters, controllers, etc. required to convert the kinetic energy into electrical energy.

The power source 208 may be connected to the power controller 214 through an electrical interconnection 224. The electrical interconnection 224 can include any wire, interface, bus, etc. between the one or more power sources 208 and the power controller 214.

The power controller 214 can also include a power source interface 336. The power source interface 336 can be any type of physical and/or electrical interface used to receive the electrical energy from the one or more power sources 208; thus, the power source interface 336 can include an electrical interface 340 that receives the electrical energy and a mechanical interface 344 which may include wires, connectors, or other types of devices or physical connections. The mechanical interface 344 can also include a physical/electrical connection 224 to the power controller 214.

The electrical energy from the power source 208 can be processed through the power source interface 336 to an electric converter 352. The electric converter 352 may convert the characteristics of the power from one of the power sources 208 into a useable form that may be used either by the battery 304 or one or more loads associated with the vehicle 100. The electrical converter 352 may include any electronics or electrical devices and/or component that can change electrical characteristics, e.g., AC frequency, amplitude, phase, etc. associated with the electrical energy provided by the power source 208. The converted electrical energy may then be provided to an optional conditioner 356. The conditioner 356 may include any electronics or electrical devices and/or component that may further condition the converted electrical energy by removing harmonics, noise, etc. from the electrical energy to provide a more stable and effective form of power to the vehicle 100.

In some embodiments, the power controller 214 may include one or more processors, controllers, and/or power output modules 360 configured to control and manage power output from the power source 208 to one or more motors or other loads of the vehicle 100. The power output module 360 may include one or more processor, a memory, switch, and/or electrical interconnection. In one embodiment, the power output module 360 may be configured to receive electrical energy provided by the power source 208 and control an output of the energy to the motors 216 and/or inverters described herein. In some cases, the power output module 360 may include one or more motor controllers.

As shown in FIG. 3, the loads of the vehicle 100 may include at least one drive unit 130. The drive unit 130 may include an inverter 260, an electric motor 216, and a gearbox 220. The gearbox 220 may include at least one power output shaft configured to provide rotational movement 364 in a direction about an output shaft axis 368. In some embodiments, the electric motor 216 can be any type of DC or AC electric motor. In some embodiments, for example, where the motor 216 is a DC motor, the drive unit 130 may not require an inverter. The motor 216 may be an induction motor (asynchronous motor), a motor with permanent magnets (synchronous motor), a reluctance motor, a universal motor, a linear motor, and/or any combination thereof having winding either on the stator, or rotor, or on both. The motor 216 may also be wireless or include brush contacts. In any event, the motor 216 may be capable of providing a torque and enough kinetic energy to move the vehicle 100.

Figure 4:
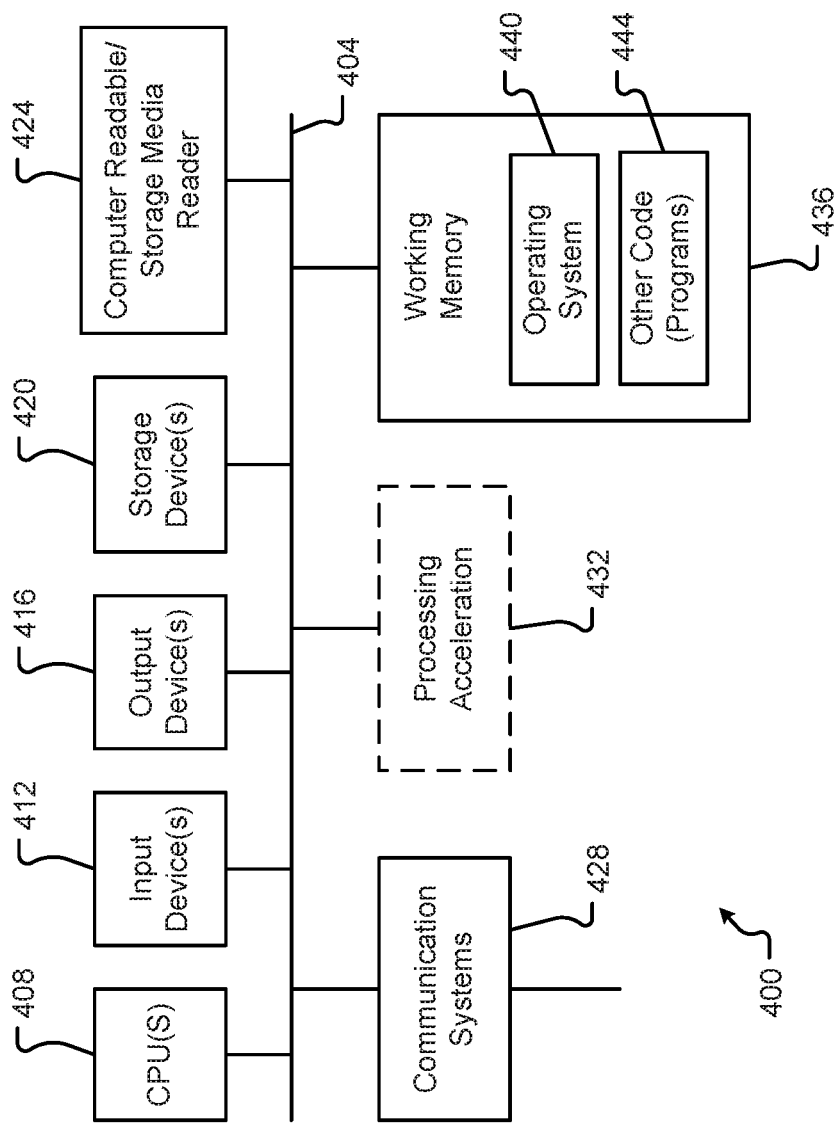
FIG. 4 is a block diagram of a computing device associated with one or more components of the vehicle in accordance with embodiments of the present disclosure.

FIG. 4 illustrates one embodiment of a computer system 400 upon which the processors, computers, computing devices, or other systems or components (e.g., power output module 360, etc.) described above may be deployed or executed. The computer system 400 is shown comprising hardware elements that may be electrically coupled via a bus 404. The hardware elements may include one or more central processing units (CPUs) 408; one or more input devices 412 (e.g., a sensor, a logic device, etc.); and one or more output devices 416 (e.g., a solenoid, a relay, etc.). The computer system 400 may also include one or more storage devices 420. By way of example, storage device(s) 420 may be disk drives, optical storage devices, solid-state storage devices such as a random access memory ("RAM") and/or a read-only memory ("ROM"), which can be programmable, flash-updateable and/or the like.

The computer system 400 may additionally include a computer-readable storage media reader 424; a communications system 428 (e.g., a modem, a network card (wireless or wired), an infra-red communication device, etc.); and working memory 436, which may include RAM and ROM devices as described above. The computer system 400 may also include a processing acceleration unit 432, which can include a DSP, a special-purpose processor, and/or the like.

The computer-readable storage media reader 424 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 428 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 400 may also comprise software elements, shown as being currently located within a working memory 436, including an operating system 440 and/or other code 444. It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 32 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

FIGS. 5A-5F show various views of a compact side-by-side drive unit 500 in accordance with embodiments of the present disclosure. The compact side-by-side drive unit 500 includes two independent motors 516A, 516B arranged adjacent to one another along a common plane running through the center of each motor 516A, 516B and drive shaft 504A, 504B. In this arrangement, the drive shaft 504A of the first motor 516A may be oriented, or facing, a direction opposite that of the drive shaft 504B of the second motor 516B. More specifically, the end of the drive shaft 504A including a drive gear 508A of the first motor 516A is oriented facing a direction opposite the end of the drive shaft 504B including a drive gear 508B of the second motor 516B. In some embodiments, the axis of each drive shaft 504A, 504B may be parallel to, and offset from one another by a specific distance, such that the axes of the drive shafts 504A, 504B are not coaxial or colinear with one another. Among other things, the compact side-by-side motor gearbox unit 500 provides a compact packaging of two independent motor gearbox units as an integrated high power density torque vectoring e-drive axle.

Figure 5A:
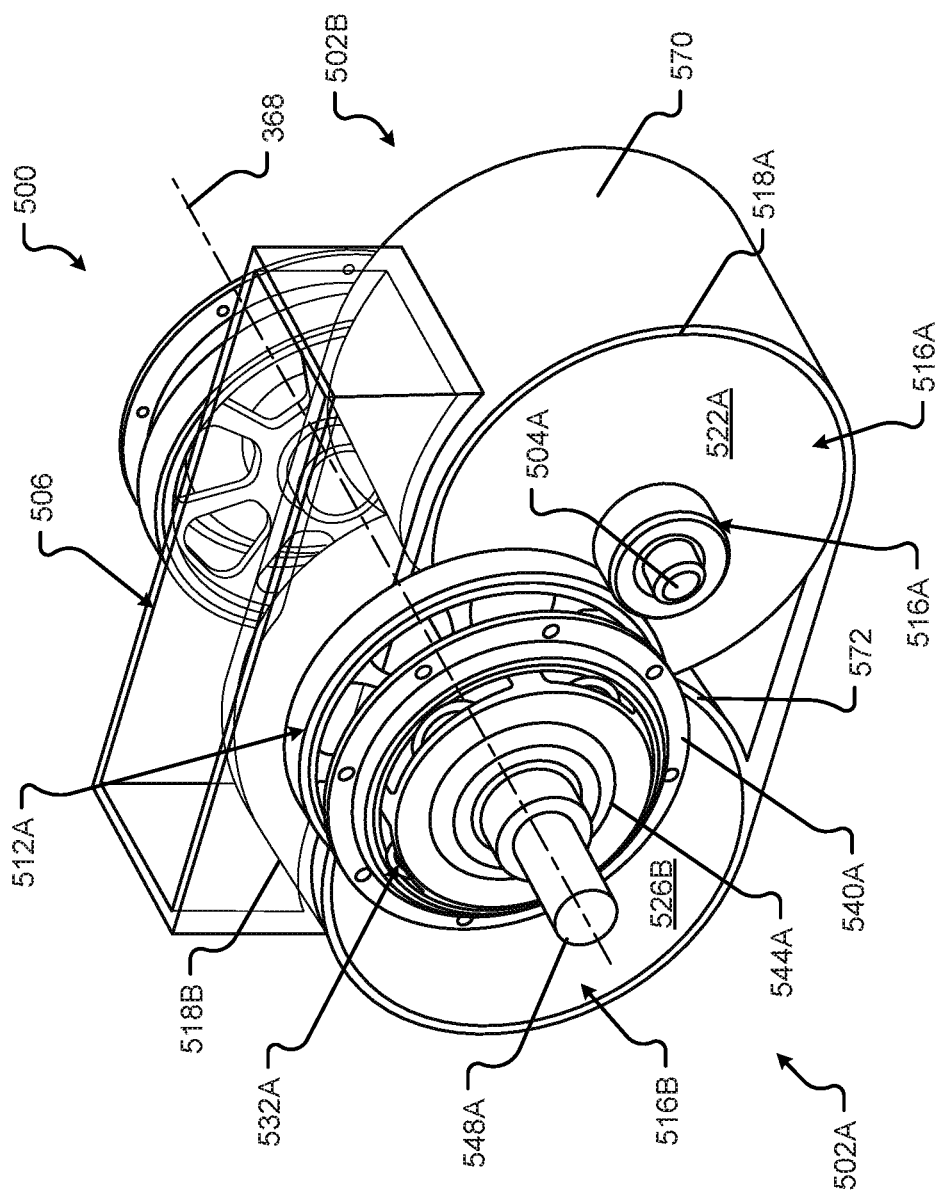
FIG. 5A shows a perspective view of a compact side-by-side motor gearbox unit in accordance with embodiments of the present disclosure.

In one embodiment, all of the components for each motor 516A, 516B and gearbox 520A, 520B may be identical, positioned symmetrically about a central vertical axis 590. This axis of symmetry 590 is illustrated in FIGS. 5C-5E. In one embodiment, the two independent motors 516A, 516B may be located side-by-side and in opposite directions, where a first motor 516A may be configured to drive at least one of the wheels 104A, 104C on a first side (e.g., the left side, etc.) of the vehicle 100 through its own gearbox 520A, and the second motor 516B may be configured to drive at least another wheel 104B, 104D on a second side (e.g., the right side, etc.) of the vehicle 100 through an identical, but oppositely mounted, gearbox 520B.

In some cases, the gearboxes 520A, 520B may be double-stage, single-speed type. For instance, the first stage may be a parallel shaft meshing with the drive gear 504A, 504B directly connected to the motor 516A, 516B. The drive gears 504A, 504B of both gearboxes 520A, 520B, may be symmetrical and 180 degrees to one another, while the power output coupling of each gearbox 520A, 520B may share a common power output axis 368. Additionally or alternatively, this centerline or axis 368 may be the centerline of the half-shafts or drive axles 106, 108, 112, 116 connected to the gearbox 520A, 520B. In one embodiment, the second stage is an epicyclic reducer. The epicyclic reducer can be a planetary, a star, or a sun configuration. As shown in FIGS. 5A-5F, the second stage may include a planetary stage reducer.

In some embodiments, the intermediate shaft may 524A, 524B and sun gear 528A, 528B may be directly connected to (e.g., bolted, welded, press-fit, spline, keyed, etc.), or indirectly coupled with (e.g., via an additional shaft, special coupling, intermediate gears, etc.), the drive gear 508A, 508B, respectively. Among other things, this arrangement allows each sun gear 528A, 528B to rotate in conjunction with the respective drive gear 508A, 508B (e.g., at the same or at a different speed, etc.). The sun gear 528A, 528B may engage with one or more planet gears 532A, 532B disposed around the respective sun gear 528A, 528B. Each of the planet gears 532A, 532B may remain in constant mesh, or rotational contact, with both the sun gear 528A, 528B and the ring gear 540A, 540B. For instance, the sun gear 528A, 528B may include teeth disposed at an outer diameter and along a periphery of the sun gear 528A, 528B, while the ring gear 540A, 540B may include teeth disposed at an inner diameter and along an internal periphery of the ring gear 540A, 540B, the planet gears 532A, 532B being disposed between the sun gear 528A, 528B and the ring gear 540A, 540B. The planet gears 532A, 532B may be configured to rotate about planet gear shafts 536A, 536B that are interconnected with a respective carrier 544A, 544B. In some embodiments, rotation of the sun gear 528A, 528B may impart a rotational force through the planet gears 532A, 532B to their respective carrier 544A, 544B, causing the carrier 544A, 544B to rotate about the output shaft axis 368. For example, the first carrier 544A may be connected to the power output shaft 548A of the first gearbox 520A that rotates about the output shaft axis 368 and the second carrier 544B may be connected to the power output shaft 548B of the second gearbox 520B that rotates about the output shaft axis 368. It should be appreciated that while shown as including a power output shaft 548A, 548B, each gearbox 520A, 520B of the compact side-by-side motor gearbox unit 500 may comprise any type of power output coupling including, but in no way limited to, a receptacle, a clamp, a splined interconnection, a joint, a keyed shaft, a keyed hole, etc., and/or combinations thereof.

As described above, the compact side-by-side motor gearbox unit 500 may include two motor gearbox interconnections, each including a motor 516A, 516B having a motor drive shaft 504A, 504B that is offset from a gearbox power output shaft 548A, 548B, respectively. For instance, the first motor 516A and the first motor drive shaft 504A may be arranged close to, or in contact with, a base of the housing 570 of the compact side-by-side motor gearbox unit 500, while the gearbox 520A may be arranged further apart, or offset, from the base of the housing 570 of the compact side-by-side motor gearbox unit 500. Among other things, this arrangement may provide a lower center of gravity for the compact side-by-side motor gearbox unit 500 (the motor 516A and motor body 518 comprising the greatest mass of the unit 500) and thus provide increased stability for a vehicle 100. For example, the base of the housing 570 of the compact side-by-side motor gearbox unit 500 may be maintained in contact with a portion of the frame 102 of the vehicle 100. The second motor 516B and gearbox 520B may be similarly, if not identically, arranged on the opposite side of the housing 570.

Figure 5B:
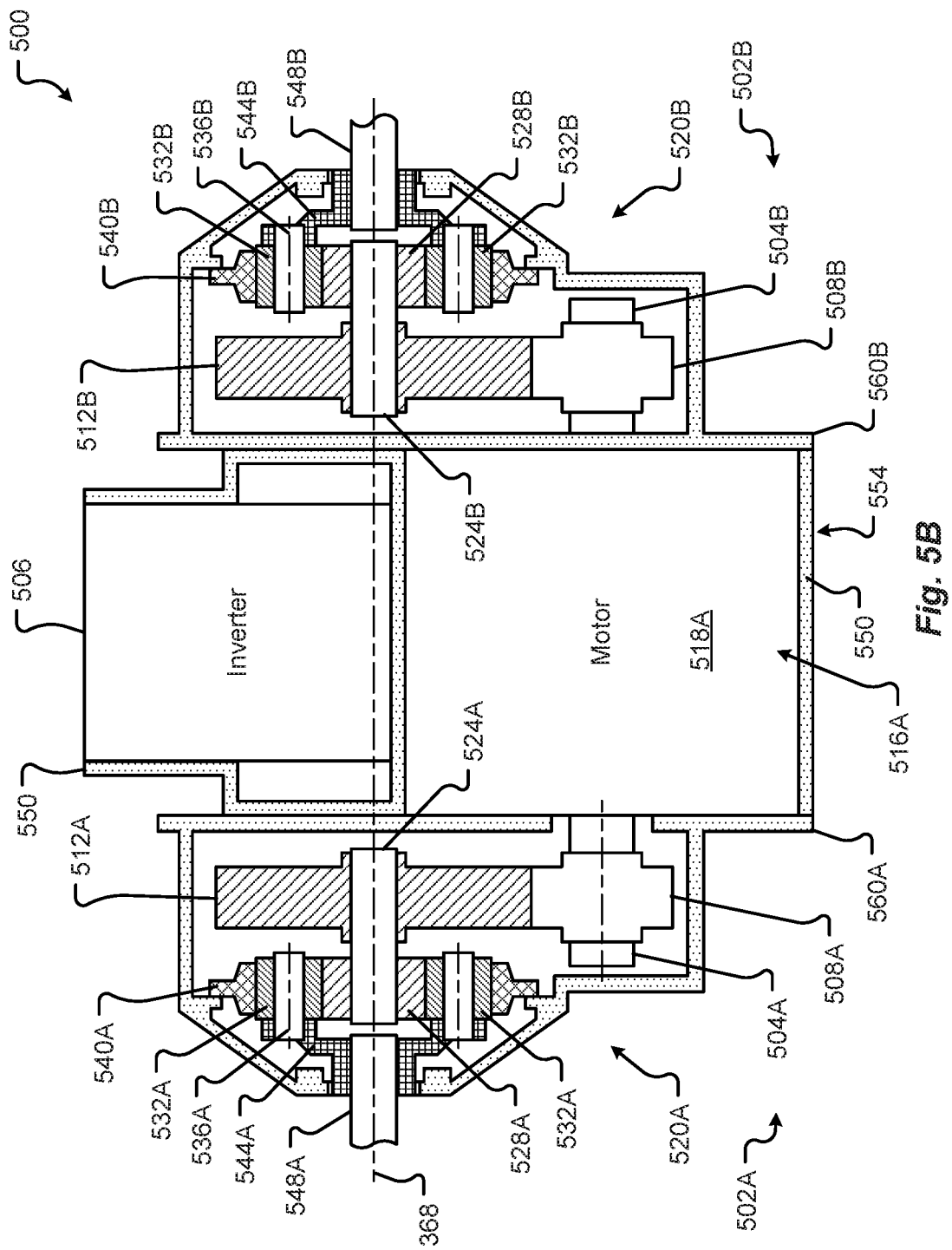
FIG. 5B shows a section view of the compact side-by-side motor gearbox unit in accordance with embodiments of the present disclosure.
Figure 5C:
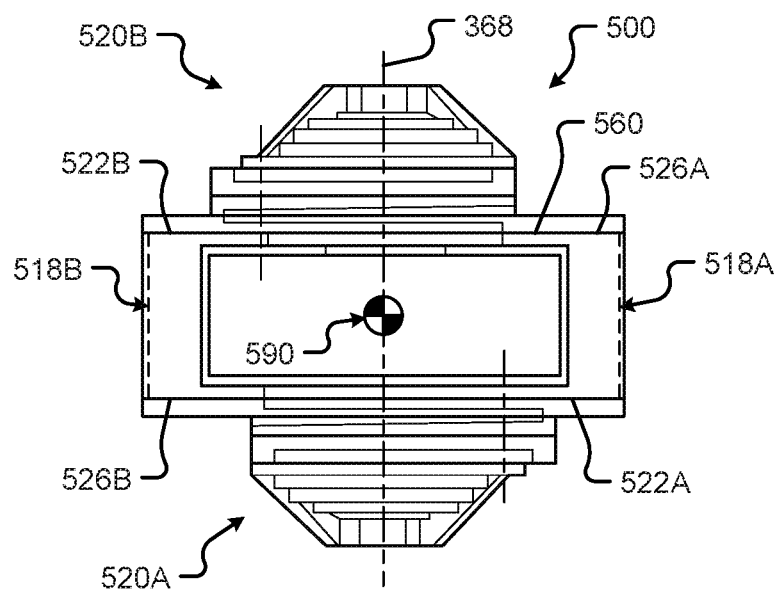
FIG. 5C shows a plan view of the compact side-by-side motor gearbox unit in accordance with embodiments of the present disclosure.
Figure 5D:
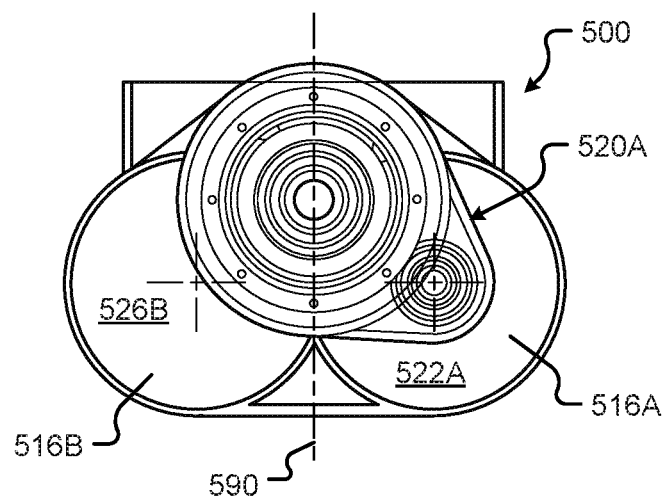
FIG. 5D shows a first elevation view of the compact side-by-side motor gearbox unit in accordance with embodiments of the present disclosure.
Figure 5E:
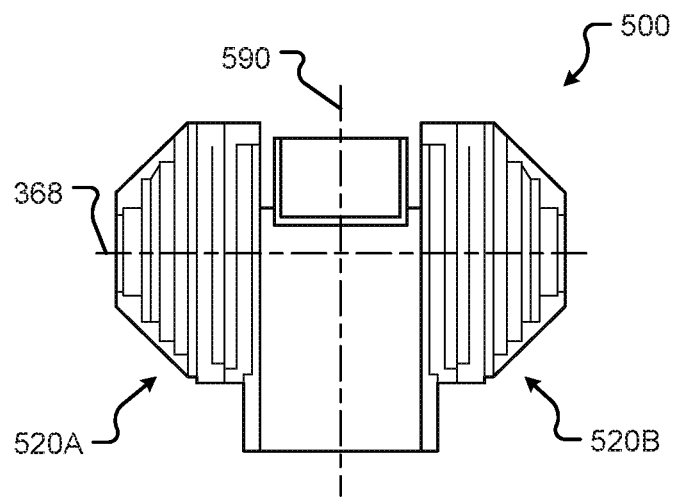
FIG. 5E shows a second elevation view of the compact side-by-side motor gearbox unit in accordance with embodiments of the present disclosure.
Figure 5F:
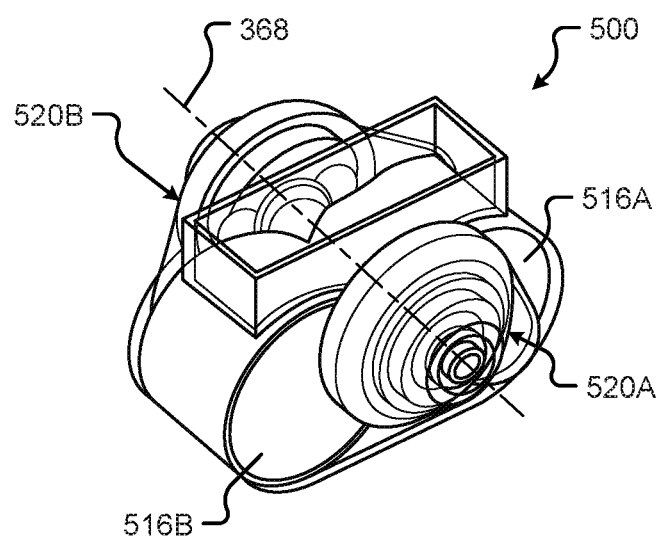
FIG. 5F shows a perspective view of the compact side-by-side motor gearbox unit in accordance with embodiments of the present disclosure.

In some embodiments, a first power output shaft 548A of the first gearbox 520A may be offset in a first direction from the first motor drive shaft 504A by a distance, for example, the vertical direction shown in FIG. 5B. The second power output shaft 548B of the second gearbox 520B may be offset in the same first direction from the first motor drive shaft 504A and the second motor drive shaft 504B, as both the first and second motor drive shafts 504A, 504B may be coplanar with one another in the housing 570. Additionally or alternatively, the gearbox power output coupling and/or shaft 548A, 548B of each gearbox 520A, 520B may be aligned with a center of the compact side-by-side motor gearbox unit 500 and offset in a second direction from each motor drive shaft 504A, 504B, respectively (e.g., the horizontal direction shown in FIG. 5B). In one embodiment, the first gearbox power output coupling or shaft 548A may be offset in a third direction from the first motor drive shaft 504A, such that the output shaft axis 368 is offset in a direction (e.g., into the page of FIG. 5B) a distance from the axis of the first motor drive shaft 504A, while the second gearbox power output coupling or shaft 548B may be offset in a an opposite direction from the second motor drive shaft 504B (e.g., out of the page of FIG. 5), such that each power output coupling or shaft 548A, 548B is colinear with the shared output shaft axis 368. The offset distance between the first gearbox 520A and the first motor drive shaft 504A and the offset distance between the second gearbox 520B and the second motor drive shaft 504B may be defined, or set, based on a size and/or an arrangement of the gears in each gearbox 520A, 520B, respectively.

In some embodiments, at least one drive wheel 104A-D may be connected to the first power output shaft 548A of the first gearbox 520A. Additionally or alternatively, at least one other drive wheel 104A-D may be connected to the second power output shaft 548B of the second gearbox 520B. In any event, the power output shafts 548A, 548B may correspond to one or more of the drive axles 106, 108, 112, 116 described in conjunction with FIGS. 1-3. In some embodiments, the power output shafts 548A, 548B and/or drive axles 106, 108, 112, 116 may be configured as drive half-shafts that are connected directly to a respective carrier 544A. 544B via a splined interconnection or through joint races directly machined into an inner diameter of the carrier 544A, 544B.

In some embodiments, the compact side-by-side motor gearbox unit 500 may include two independent motors 516A, 516B, each including an offset gearbox 520A, 520B having a shared power output shaft axis 368. For instance, a first drive gear 508A and first gearbox 520A associated with a first motor 516A may be disposed on a first side 502A of a housing 570, while a second drive gear 508B and second gearbox 520B associated with a second motor 516B may be disposed on a second side 502B of the housing 570.

In one embodiment, the compact side-by-side motor gearbox, or drive, unit 500 of FIGS. 5A-5F may be similar, if not identical, to the drive units 130, 130A-D as described in conjunction with FIGS. 1-3. The compact side-by-side drive unit 500 may include a first and second electric motor 516A, 516B mechanically interconnected to a gearbox 520A, 520B via a motor drive shaft 504A, 504B, respectively. As can be appreciated, the motors 516A, 516B may be similar, if not identical, to the motor 216 described in conjunction with FIGS. 1-3. In some embodiments, the compact side-by-side drive unit 500 may include at least one inverter 506 that receives DC power and outputs AC power to the one or more of the motors 516A, 516B. The inverter 506 may serve to regulate the power fed to one or both of the motors 516A, 516B. In some embodiments, the compact side-by-side drive unit 500 may include a single inverter 506 or by a dual inverter 506 (e.g., an inverter 506 including components capable of providing converted electricity to the dual motors 516A, 516B, etc.). In one embodiment, the single and/or dual inverter 506 may have its own housing or share a portion of the housing 570 receiving the motors 516A, 516B.

The compact side-by-side drive unit 500 may be configured to maximize half-shaft lengths and reduce the packaging size (e.g., overall dimensions, length x width y, height z, etc.) of the compact side-by-side drive unit 500 in the vehicle. Among other things, this unique packaging provides a high power density and lower position (e.g., lowering the center of gravity of the vehicle, etc.) of the compact side-by-side drive unit 500, which can result in improved vehicle dynamics. An additional benefit of the compact side-by-side drive unit 500 includes torque vectoring of the axle based on utilizing two independent motors 516A, 516B.

Referring to FIG. 5A, a perspective view of a compact side-by-side drive unit 500 is shown in accordance with embodiments of the present disclosure. As shown in FIG. 5A, the gearbox housings 560A, 560B associated with each side 502A, 502B of the housing 570 are removed (for clarity) and a schematic gear set between the first motor 516A and the first power output shaft 548A is illustrated. While any gear ratio, set, or arrangement may be disposed between the drive shaft 504A and the power output shaft 548A, the gear set of FIG. 5A is configured as an epi cyclic reducer. Moreover, while shown including a power output shaft 548A, it should be appreciated that the compact side-by-side drive unit 500 may include any type of power output coupling disposed on opposite sides 502A, 502B of the housing 570 and sharing a common power output axis 368.

The first motor 516A, as illustrated in FIG. 5A, includes a first drive shaft 504A extending from a front face 522A of the first motor 516A and away from a center of the compact side-by-side drive unit 500. In some embodiments, the front face 522A of the first motor 516A may be substantially coincident, or coplanar, with the rear face 526B of the second motor 516B in the housing 570. In one embodiment, the front face 522A of the first motor 516A may be adjacent to and offset from the rear face 526B of the second motor 516B in the housing 570, such that the front face 522A of the first motor 516A is closer (in distance) to the rear face 526B of the second motor 516B than the front face 522B of the second motor. In any event, the front face 522A of the first motor 516A may be facing a first direction while the front face 522B of the second motor 516B may be facing a second direction opposite the first direction.

In some embodiments, the first and second motors 516A, 516B may be packaged at least partially inside the housing 570 such that the first gearbox 520A is spaced apart from the second gearbox 520B along the shared power output axis 368 by a distance substantially equal to a length of a single motor 516A, 516B (e.g., including clearances, minimal housing dimensions, and/or wall thicknesses, etc.). This compact arrangement may provide for additional space in the drivetrain of the vehicle 100. In one embodiment, the first and second motors 516A, 516B may be disposed side-by-side in the housing 570, separated by a wall 572 or material thickness of the housing 570. The housing 570 may include one or more receptacles, receiving cavities, or other volumes configured to at least partially receive and/or contain the first and second motors 516A, 516B and/or a portion of the motor body 518A, 518B.

Each gearbox 520A, 520B may include a separate gearbox housing 560A, 560B, respectively. The gearbox housings 560A, 560B may be configured to at least partially contain one or more elements, gears, shafts, and/or couplings of each gearbox 520A, 520B. In some embodiments, the gearbox housings 560A, 560B may be attached to, or otherwise interconnected with, the housing 570 of the motors 516A, 516B.

The compact side-by-side drive unit 500 may include an inverter 506 attached thereto. In one embodiment, the compact side-by-side drive unit 500 may include dual inverter, separate inverters for each motor, and/or other motor drive unit(s). The inverter 506 may be received by an inverter housing separate from or integrated with the housing 570 of the motors 516A, 516B or compact side-by-side drive unit 500. The inverter 506 may share a portion of the housing 570, a drive unit cooling system, cooling elements, electrical interconnections, and/or some other part of the compact side-by-side drive unit 500. In some embodiments, the inverter 506 may be mounted between the gearboxes 520A, 520B. Additionally or alternatively, the inverter 506 may be mounted directly above a portion of the motors 516A, 516B. The inverter 506 may be sized to sit above the motors 516A, 516B and below, or flush with, an uppermost portion of the gearboxes 520A, 520B or gearbox housings 560A, 560B providing a vertically compact integrated unit 500. In any event, the inverter 506 may be separated from the motors 516A, 516B by a wall thickness of the housing 570.

FIGS. 5B-5F show various views of the compact side-by-side drive unit 500 with the gearbox housings 560A, 560B or covers attached, in accordance with embodiments of the present disclosure. The compact side-by-side drive unit 500 may include a central axis of symmetry 590, about which, the motors 516A, 516B and gearboxes 520A, 520B are symmetrically arranged. In some embodiments, the central axis of symmetry 590 may represent an axis defining a location of the center of gravity for the compact side-by-side drive unit 500. Additionally or alternatively, the shared power output axis 368 may pass perpendicularly to, and even through, the axis of symmetry 590, as illustrated in FIG. 5E.

The compact side-by-side drive unit 500 offers a number of advantages beyond conventional drive unit arrangements. For instance, rather than arranging two motor gearbox units such that the motors and drive shafts are in-line, or colinear, with one another, such that each motor gearbox unit is the mirror image of the other through a planar symmetry adding to an overall length or space taken up by the package and/or powertrain elements, the compact side-by-side drive unit 500 allows the overall space taken up in the drive axle and power output axis 368 direction to be reduced to a minimal length. This minimal length may substantially equal the length of a single motor and two gearboxes rather than the length of two motors and two gearboxes arranged in-line. By reducing the overall package size, the compact side-by-side drive unit 500 allows the length and inclination of the half-drive shafts (e.g., 106, 108, 112, 116, 548A, 548B, etc.) to be optimized. Moreover, the axis symmetry of the compact side-by-side drive unit 500 may reduce manufacturing and/or inventory costs as the motors 516A, 516B, the gearboxes 520A, 520B, and even the gearbox housings 560A, 560B may be identical, or substantially, similar.

Although represented by gears in the present disclosure, it should be appreciated that the interconnection between one or more of the rotating elements in the compact side-by-side drive unit 500 etc. may include, but are in no way limited to, one or more belts, pulleys, chains, fluid contacting surfaces, linkages, and/or combinations thereof.

Figure 6:
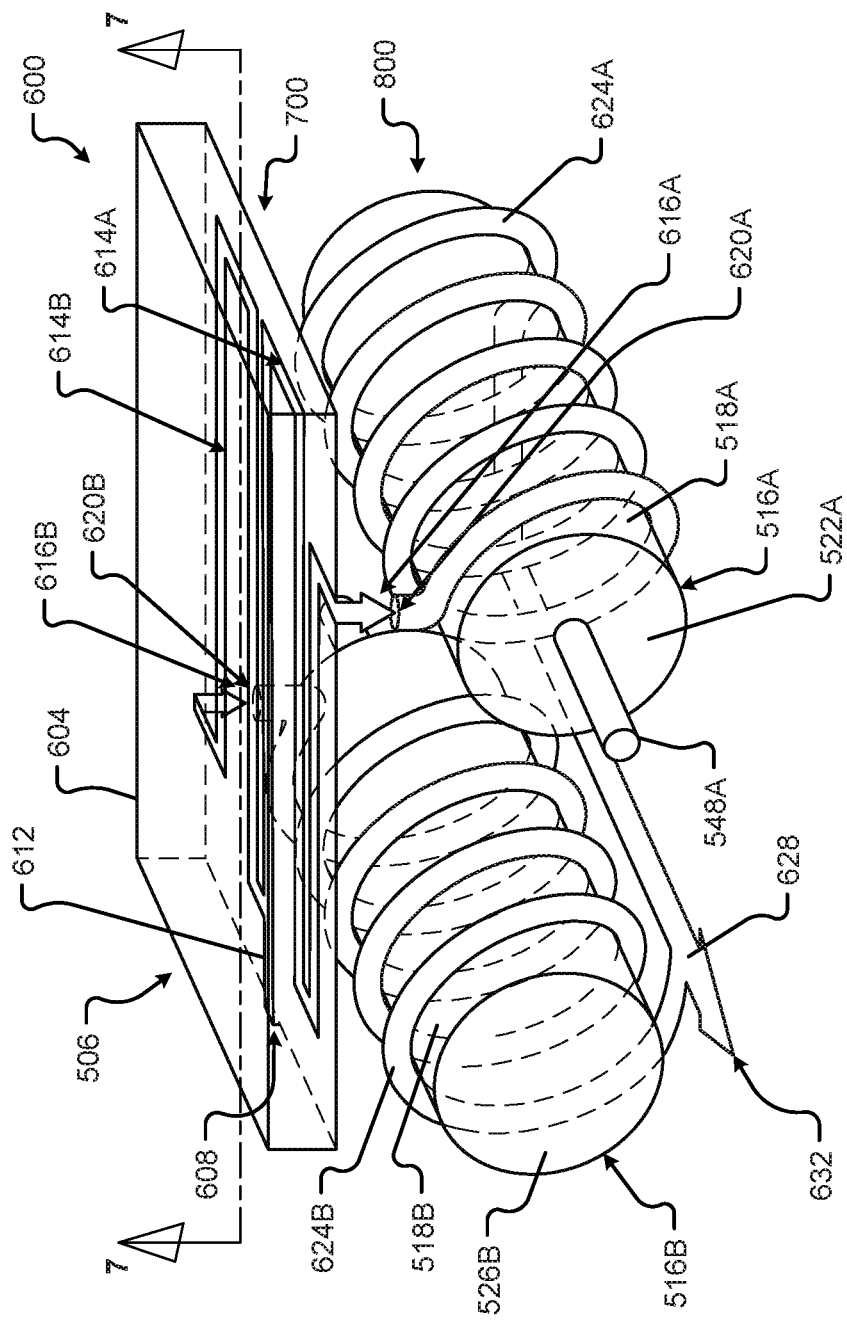
FIG. 6 shows a schematic perspective view of a dual inverter and motor split-flow cooling system in accordance with embodiments of the present disclosure.

FIG. 6 shows a schematic perspective view of a dual inverter and motor split-flow cooling system 600 in accordance with embodiments of the present disclosure. Although several components have been hidden in FIG. 6 for clarity, the dual inverter and motors may correspond to the motors 516A, 516B and inverter 506 of the compact side-by-side drive unit 500 described in conjunction with FIGS. 5A-5F above. For instance, the split-flow cooling system 600 may be employed to cool the inverter 506 and the motors 516A, 516B as configured and/or arranged in the compact side-by-side drive unit 500.

The split-flow cooling system 600 may include a system of cooling chambers and channels 612, 614A, 614B, 624A, 624B, 628 configured to direct coolant along a number of paths to actively cool the inverter 506 and motors 516A, 516B. In one embodiment, the split-flow cooling system 600 may be separated into cooling stages 700, 800. For instance, the first stage 700 may correspond to a cooling arrangement for the inverter 506, while the second stage 800 may correspond to a cooling arrangement for the dual motors 516A, 516B. These cooling stages 700, 800 may be integrally formed in a single housing 570 that is configured to receive the motors 516A, 516B and the inverter 506. Alternatively, the first stage 700 may be associated with at least a portion of an inverter housing 604 and the second stage 800 may be associated with at least a portion of a separate housing 570 receiving the motors 516A, 516B. In this example, the first stage 700 and the second stage 800 may be connected at a flanged mount area, sealed interconnection (e.g., via an O-ring, gasket, adhesive, silicone, etc.), threaded joint, swage lock joint, ferruled connection, face-to-face contact surface, etc., and/or combinations thereof. In some embodiments, the first stage 700 and the second stage 800 are connected via coolant flow channels is the same housing. In any event, the split-flow cooling system 600 may be configured to direct coolant from the first stage 700 to the second stage 800. Once the coolant has passed through the first and second stages 700, 800, the coolant may be passed onto a thermal management system, refrigeration unit, conditioner, and/or recirculating cooling system. In some embodiments, the two coolant flows in each motor might merge into one in the motor housing or in the inverter housing before being passed to the thermal management system.

In one embodiment, a portion of the inverter 506 may include a cooling chamber 612 and number of cooling channels 614A, 614B disposed therein. This cooling portion may be part of a housing, a cooling body 604 (e.g., housing body, inverter body, etc.), a separate cooling plate, and/or combinations thereof. The cooling portion may be disposed between the inverter 506 and the motors 516A, 516B. In this arrangement, coolant flowing through the cooling chamber and channels 612, 614A, 614B of the first stage 700 may simultaneously cool the inverter 506 and at least a portion of the motors 516A, 516B (e.g., running over an outer portion, top, etc.). In some embodiments, the base 606 of the cooling body 604 may be adjacent to, or in contact with, one or more of the motors 516A, 516B (e.g., running across a portion of each motor body, etc.). As can be appreciated, this orientation of the cooling body causes the coolant to cool the inverter 506 and at least a portion of the motors 516A, 516B at the same time.

Coolant is received by the cooling body 604 via an inlet 608 and directed along a single cooling chamber 612. The cooling chamber 612, or coolant supply chamber, may be sized having a first cross-sectional area. In shape, the cross-sectional area may be substantially circular, square, rectangular, etc., or combinations thereof. In one embodiment, the cooling chamber 612 may be machined, formed, or etched in the cooling body 604. In some embodiments, the cooling chamber 612 may be tubing (e.g., copper, aluminum, stainless steel, titanium, etc.) that is inserted, pressed, potted, or otherwise routed, inside a portion (e.g., machined or formed grooves, wells, cuts, etc.) of the cooling body 604.

The cooling chamber 612 may bifurcate, or split, at one or more points into a first cooling channel 614A and a second cooling channel 614B. The first and second cooling channels 614A, 614B may follow a cooling path within the cooling body 604. The cooling path may define a flow path from the inlet 608 to the first and second inverter outlets 616A, 616B. The path of the first cooling channel 614A may extend from the cooling chamber 612 along a length of the cooling body 604 and return along the length of the cooling body 604 at an offset distance toward an end of the channel 614A, or the first inverter outlet 616A. The path of the second cooling channel 614B may similarly extend from the cooling chamber 612 along a length of the cooling body 604 and return along the length of the cooling body 604 at an offset distance toward an end of the second channel 614B, or the second inverter outlet 616B. In some embodiments, the flow path of each cooling channel 616A, 616B may extend outwardly from a center of the cooling body 604 or inverter 506 to an outer periphery of the cooling body 604 or inverter 506. In any event, the first cooling channel 614A terminates, or ends, at the first inverter outlet 616A and the second cooling channel 614B terminates, or ends, at the second inverter outlet 616B.

In some embodiments, the outlets 616A, 616B from the first stage 700 of the split-flow cooling system 600 may interconnect to respective inlets 620A, 620B of the second stage 800 of the system 600. In one embodiment, the first and second cooling channels 614A, 614B of the first stage 700 may continue (e.g., via a continuous tube, integral single line, and/or uninterrupted flow path, etc.), into the second stage 800 as first and second motor cooling channels 624A, 624B, respectively. In any event, the first motor cooling inlet 620A may be disposed adjacent to a front or rear face 522A, 526A of the first motor 516A and the second motor cooling inlet 620B may be disposed adjacent to the other of the front or rear face 522B 526B of second motor 516B (e.g., at a location opposite the front or rear face 522A, 526B of the first motor 516A having the first motor cooling inlet 620A).

The second stage 800 of the motor cooling split-flow cooling system 600 may be configured having separate motor cooling channels 624A, 624B configured to direct coolant around at least a portion of each motor 516A, 516B along separate cooling paths. Each motor cooling channel 624A, 624B may be configured to run from a first end to a second opposite end of each motor 516A, 516B. In one embodiment, the first motor cooling channel 624A may include a portion (e.g., the first motor cooling inlet 620A) disposed at a first end of the motor 516A (e.g., adjacent to the front face 522A), and include a coolant path helically wrapping around, or surrounding, a body 518A of the first motor 516A, that the first motor cooling channel 624A follows. In this embodiment, the coolant directed in the first motor cooling channel 624A may travel from the first end (e.g., adjacent to the front face 522A) helically around the motor 516A toward a second end (e.g., adjacent to the rear face 526A) of the motor 516A. The second motor cooling channel 624B may include a portion (e.g., second motor cooling inlet 620B) disposed at a first end of the second motor 516B (e.g., adjacent to the front face 522B of the second motor 516B), and include a coolant path helically wrapping around, or surrounding, a body 518B of the second motor 516B, that the second motor cooling channel 624B follows. In this embodiment, the coolant directed in the second motor cooling channel 624B may travel from the first end (e.g., adjacent to the front face 522B) helically around the second motor 516B toward a second end (e.g., adjacent to the rear face 526B) of the second motor 516B.

Although shown as running from the front faces 522A, 522B of each motor 516A, 516B to the rear faces 526A, 526B of each motor 516A, 516B, it should be appreciated that the respective cooling channels 624A, 624B may run from the rear faces 526A, 526B of each motor 516A, 516B to the front faces 522A, 522B of each motor 516A, 516B. Alternatively, the first cooling channel 624A may run from the front face 522A in a direction toward the rear face 526A of the first motor 516A, while the second cooling channel 624B may run from the front face 522B in a direction toward the rear face 526B of the second motor 516B, or vice versa. In any event, the direction of the coolant flow directed in the first cooling channel 624A may be the same as, or opposite, the direction of the coolant flow directed in the second cooling channel 624B along the motors 516A, 516B. As the coolant is directed from the first and second motor cooling channels 624A, 624B, the coolant may be directed toward a single outlet 632 of the split-flow cooling system 600 and the second stage 800.

In one embodiment, the separate motor cooling channels 624A, 624B may combine into a single, common, or shared chamber 628. Coolant exiting the split-flow cooling system 600 and the second stage 800 may travel along the shared chamber 628 to a combined cooling system outlet 632. The combined cooling system outlet 632 may be configured as an orifice, aperture, opening, tubing end, and/or as a connection to another coolant return line (e.g., tubing, channel, etc.). In one embodiment, the separate motor cooling channels 624A, 624B may be configured as having a first cross-sectional area along at least a portion of its length and the shared chamber 628 may have a second cross-sectional area along at least a portion of its length. The first and second cross-sectional areas may define an area through which coolant may flow. In one embodiment, the first cross-sectional area may be less, or smaller, than the second cross-sectional area. In another embodiment, the first cross-sectional area may be greater, or larger, than the second cross-sectional area. In yet another embodiment, the first cross-sectional area may be substantially the same size as the second cross-sectional area. Similar to the interconnection described in conjunction with the outlets from the first stage 700, the combined cooling system outlet 632 may interconnect with the coolant return line at a flanged mount area, sealed interconnection (e.g., via an O-ring, gasket, adhesive, silicone, etc.), threaded joint, swage lock joint, ferruled connection, face-to-face contact surface, etc., and/or combinations thereof.

Figure 7:
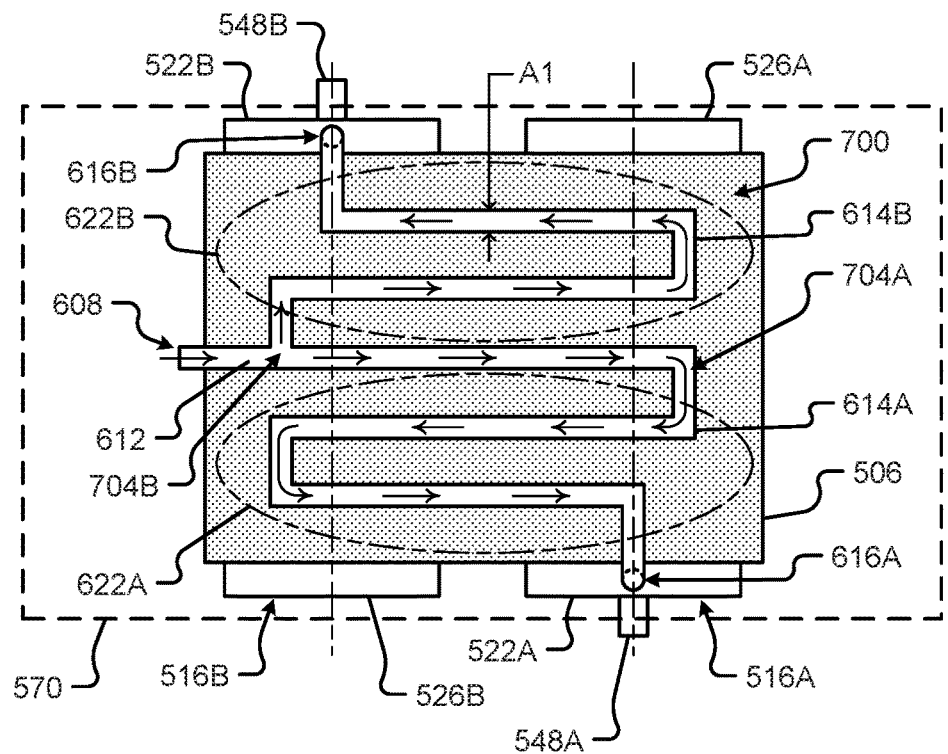
FIG. 7 shows a schematic section plan view of a first stage of the dual inverter and motor split-flow cooling system in accordance with embodiments of the present disclosure.

FIG. 7 shows a schematic section plan view of a first stage 700 of the dual inverter and motor split-flow cooling system 600 in accordance with embodiments of the present disclosure. In one embodiment, the section may be taken through line 7-7 shown in FIG. 6. As illustrated in FIG. 7, the first stage 700 of the cooling system 600 may include an inlet 608 configured to receive a coolant and/or interconnect with a cooling line. The interconnection of the inlet 608 to the cooling line may be similar, if not identical, to the interconnections described above and in conjunction with FIG. 6. The coolant may be directed or guided along cooling channels 614A, 614B in the housing, cooling plate, or base of the inverter 506. The arrows inside the cooling channels 614A, 614B show an example direction of flow for coolant, or other cooling fluid, passing through the cooling channels 614A, 614B and the first stage 700 of the cooling system 600.

In one embodiment, the coolant entering the first stage 700 may be directed along the cooling chamber 612 and split at a first flow-directing point 704A and a second flow-directing point 704B. In some embodiments, the split may be configured as at least one bifurcated cooling channel, a split cooling channel, a tee (or T-shaped) junction, a Y-shaped junction, an elbow, etc., and/or combinations thereof. In any event, as coolant enters the first stage 700, the coolant is directed from the cooling chamber 612 to a first flow-directing point 704A that directs a portion of the coolant to a first inverter outlet 616A, via a first cooling channel 614A, while a portion of the coolant in the cooling channel is directed to a second flow-directing point 704B, via a second cooling channel 614B, that directs the portion of the coolant to a second inverter outlet 616B. In some embodiments, the first inverter outlet 616A may be disposed on an opposite side of the cooling system 600, inverter 506, or first stage 700 than the second inverter outlet 616B.

The cooling chamber 612 may bifurcate, or split, at one or more points into a first cooling channel 614A and a second cooling channel 614B. The first and second cooling channels 614A, 614B may follow a cooling path within the cooling body 604 or inverter 506. The cooling path may define a flow path from the inlet 608 to the first and second inverter outlets 616A, 616B. The path of the first cooling channel 614A may extend from the cooling chamber 612 along a length of the cooling body 604 or inverter 506 and return along the length of the cooling body 604 or inverter 506 at an offset distance toward an end of the channel 614A, or the first inverter outlet 616A. The path of the second cooling channel 614B may similarly extend from the cooling chamber 612 along a length of the cooling body 604 or inverter 506 and return along the length of the cooling body 604 or inverter 506 at an offset distance toward an end of the second channel 614B, or the second inverter outlet 616B. In some embodiments, the flow path of each cooling channel 616A, 616B may extend outwardly from a center of the cooling body 604 or inverter 506 to an outer periphery of the cooling body 604 or inverter 506. In any event, the first cooling channel 614A terminates, or ends, at the first inverter outlet 616A and the second cooling channel 614B terminates, or ends, at the second inverter outlet 616B.

In one embodiment, the first cooling channel 614A may be configured to cool a first area 622A (e.g., surface area, surface, housing surface, etc.) of the inverter 506 and the second cooling channel 614B may be configured to cool a second area 622B (e.g., surface area, surface, housing surface, etc.) of the inverter 506. In some embodiments, the first and second areas 622A, 622B may be coplanar with one another. The first and second areas 622A, 622B may be configured adjacent to one another but not overlapping one another. In some cases, the first and second areas 622A, 622B may be different parts or areas of the same surface.

The cooling chamber 612 and/or cooling channels 614A, 614B may include a cross-sectional area configured to receive and convey fluid that is similar, if not identical, to the first or second cross-sectional area described in conjunction with FIG. 6. As illustrated, the cross-sectional area of the cooling chambers/channels 612, 614A, 614B may be substantially similar to the first cross-sectional area, A1, described above. It should be appreciated that certain benefits in cooling may be gained by altering the cross-sectional areas of the various cooling channels and chambers 612, 614A, 614B, 624A, 624B, 628 of the split-flow cooling system 600.

In FIG. 7, the electric motors 516A, 516B are shown in a compact side-by-side configuration where the drive shaft 548A of the first motor 516A is facing in an opposite direction than the drive shaft 548B of the second motor 516B, wherein the axes of the drive shafts 548A, 548B are not colinear with one another. In some embodiments, the split-flow cooling system 600 may be employed by a motor configuration where the drive shaft 548A of the first motor 516A is facing in the same direction as the drive shaft 548B of the second motor 516B.

As described above, the coolant may be configured to exit the first stage 700 of the split-flow cooling system 600 at the first and second inverter outlets 616A, 616B. In some embodiments, the first and second inverter outlets 616A, 616B may be disposed in-line with the first and second motor cooling inlets 620A, 620B, respectively. In one embodiment, the cooling channels and chambers 612, 614A, 614B, 624A, 624B, 628 may be part of a single cooling path formed in the housing of the motors 516A, 516B and/or inverter 506. In another embodiment, the cooling channels and chambers 612, 614A, 614B, 624A, 624B, 628 may be part of separate cooling paths and/or lines formed in, or associated with, the housing of the motors 516A, 516B and/or the inverter 506. In any event, the stages 700, 800 described herein are not intended to limit the scope of the disclosure to integral or connected separate cooling channels, and as such, may refer to different stages of cooling that are associated with the split-flow cooling system 600.

Figure 8:
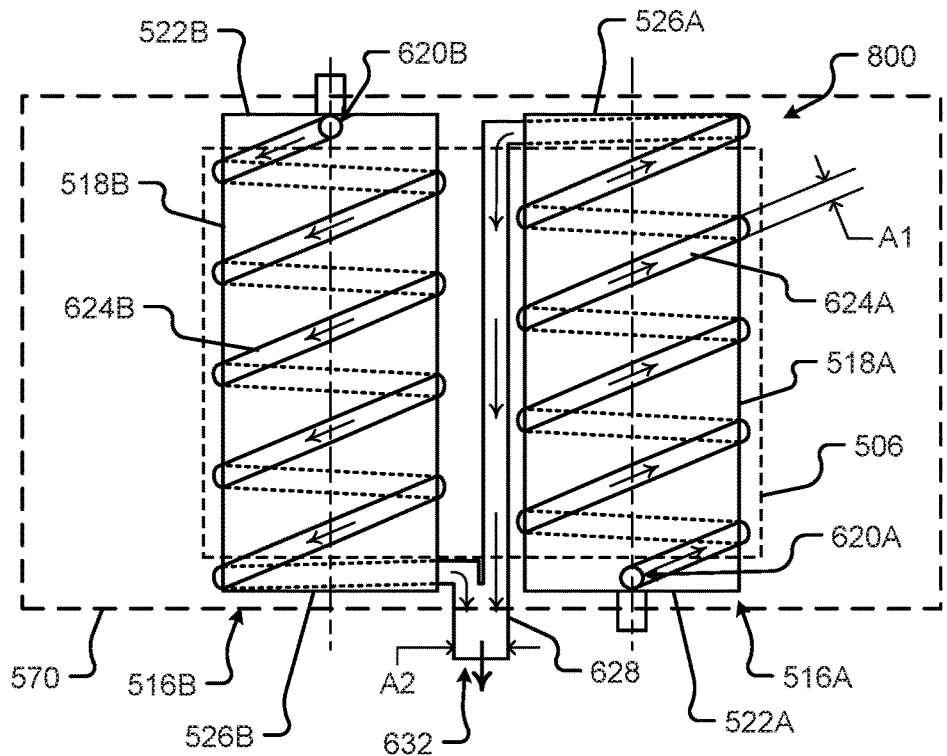
FIG. 8 shows a schematic section plan view of a second stage of the dual inverter and motor split-flow cooling system in accordance with embodiments of the present disclosure.

Referring to FIG. 8, a schematic section plan view of the second stage 800 of the dual inverter and motor split-flow cooling system 600 is shown in accordance with embodiments of the present disclosure. The plan view may be taken from a position directly under, or adjacent to, the first stage 700. Among other things, the plan view illustrates details of the second stage 800 shown and described in conjunction with FIG. 6. The inverter 506 is shown, for reference, in hidden lines above the second stage 800. As shown in FIG. 8, the first and second motor cooling inlets 620A, 620B may be disposed in-line with the first and second inverter outlets 616A, 616B, respectively. The arrows inside the first and second motor cooling channels 624A, 624B show an example direction of flow for coolant, or other cooling fluid, passing through the first and second motor cooling channels 624A, 624B and the second stage 800 of the cooling system 600.

The first and second motor cooling channels 624A, 624B may include a cross-sectional area configured to receive and convey fluid that is similar, if not identical, to the cross-sectional areas described in conjunction with FIGS. 6 and 7. As illustrated, the cross-sectional area of the first and second motor cooling channels 624A, 624B may be substantially similar to the first cross-sectional area, A1, described above. In some embodiments, the coolant may be directed along a length of each motor 516A, 516B in the same or opposite directions. In any event, the coolant from each motor cooling channel 624A, 624B may join with a single, common, or shared chamber 628. This common chamber 628 may include a second cross-sectional area, A2, as described in conjunction with FIG. 6. Coolant exiting the second stage 800 of the split-flow cooling system 600 may exit the motor housing, combined housing, cooling plate, etc., via a combined cooling system outlet 632 that may be configured as an orifice, aperture, opening, tubing end, and/or as a connection to another coolant return line (e.g., tubing, channel, etc.).

Figure 9:
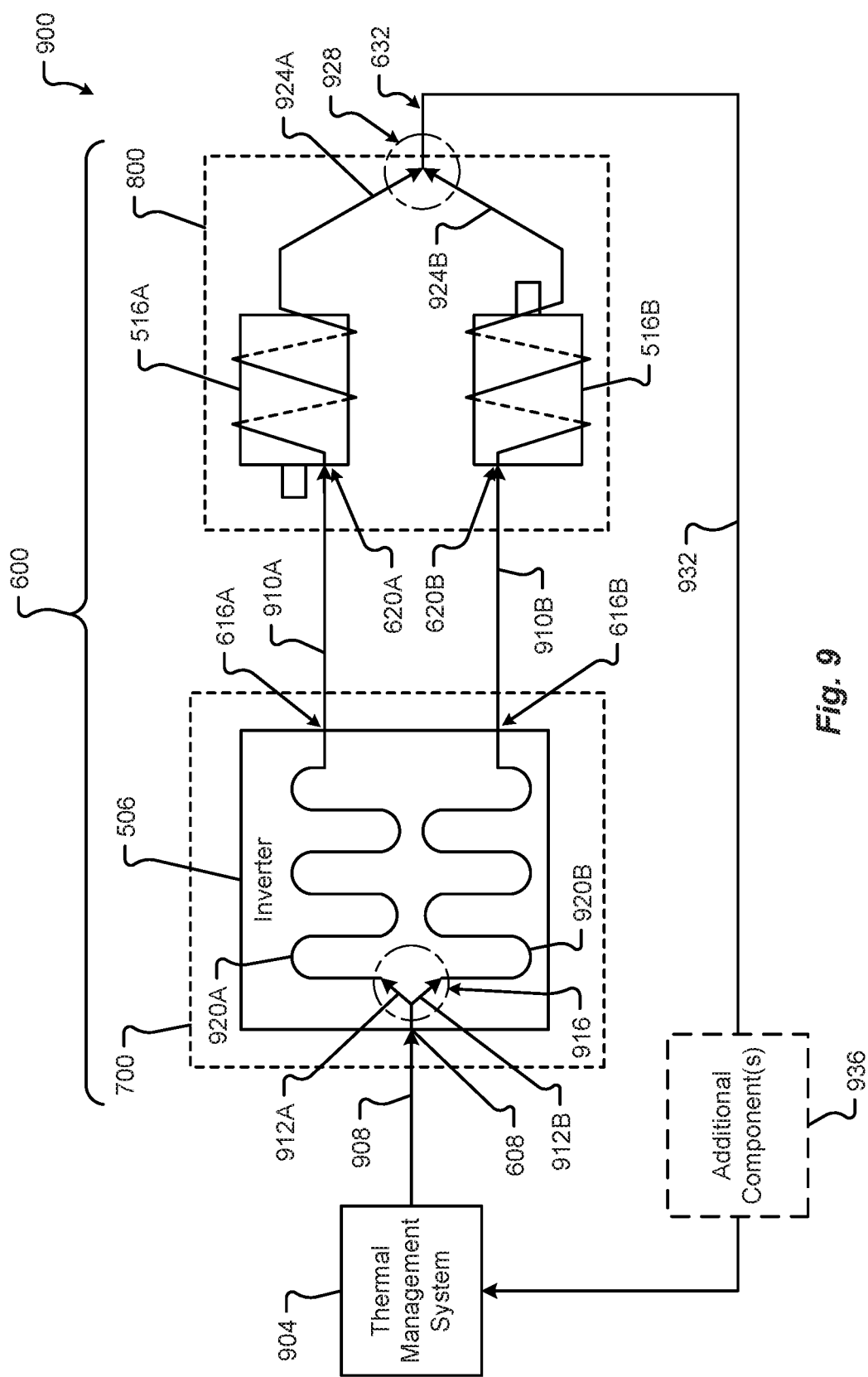
FIG. 9 shows a schematic block diagram of the dual inverter and motor split-flow cooling system in accordance with embodiments of the present disclosure.

FIG. 9 shows a schematic block diagram of the dual inverter and motor split-flow cooling system 600 and thermal management loop 900 in accordance with embodiments of the present disclosure, especially those embodiments described in conjunction with FIGS. 6-8. The thermal management loop 900 may include a thermal management system 904 configured to condition, cool, pump, direct, and/or force coolant through the split-flow cooling system 600 and/or any other additional components 936 or systems of the vehicle 100. The thermal management system 904 may include a temperature controller and one or more temperatures sensors configured to maintain coolant in the loop 900 at a particular controlled range of temperatures. The controller may further control the pump, valves, refrigeration units, and/or other aspect of, or component in, the thermal management loop 900.

As illustrated in FIG. 9, coolant may exit the thermal management unit 904 via a supply line 908. The supply line 908 may be configured as any tube, pipe, channel, or coolant line configured to convey coolant (e.g., fluid, gas, etc.) from a source to a destination. The supply line 908 may be interconnected with an inlet 608 of a split-flow cooling system 600 and distributed within a first stage 700 of the cooling system 600. As the coolant enters the first stage 700, the coolant may be directed via a bifurcation, split, or other diverting element disposed in a common channel section 916. A first portion of the coolant may be directed along a first cooling line, or channel, 920A and a second portion of the coolant may be directed along a different second cooling line, or channel, 920B. The cooling channels 920A, 920B may correspond to the cooling channels 614A, 614B as described in conjunction with FIG. 7. In any event, the cooling channels 920A, 920B may be configured to cool separate areas of the inverter 506 before exiting out of the inverter 506 or housing via separate outlets 616A, 616B.

After exiting the first stage 700, the coolant may be conveyed along separate second stage supply lines 910A, 910B to respective motor cooling inlets 620A, 620B in the second stage 800. The coolant may then follow first and second motor cooling channels 624A, 624B that may follow a length of each motor 516A, 516B before joining together at a single, common, or shared chamber 928. The shared chamber 928 may correspond to the shared chamber 628 described in conjunction with FIGS. 6 and 8. In some embodiments, a single outlet 632 may be interconnected with the shared chamber 928 and coolant may exit via this shared single outlet 632 through a return channel, or line, 932 back to the thermal management system 904. In one embodiment, prior to returning to the thermal management system 904, the return channel 932 may feed into one or more additional components 936 of the vehicle 100. In some embodiments, the shared chamber 928 might be part of the first stage 700, in other embodiments, the shared chamber 928 might be part of the second stage 800.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system.

Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an apples, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a cooling system, comprising: a cooling supply chamber disposed adjacent to and along a length of an inverter, the cooling supply chamber configured to receive coolant; a first cooling channel extending from and in fluid connection with the cooling supply chamber, the first cooling channel following a path arranged to cool a first area of the inverter; a second cooling channel extending from and in fluid connection with the cooling supply chamber, the second cooling channel following a path arranged to cool a different second area of the inverter, wherein the first cooling channel ends at a first outlet, and wherein the second cooling channel ends at a different second outlet; a first motor cooling channel interconnected with the first outlet of the first cooling channel, the first motor cooling channel configured to follow a length of a first electric motor; and a second motor cooling channel interconnected with the second outlet of the second cooling channel, the second motor cooling channel configured to follow a length of a second electric motor, wherein the first and second motor cooling channels interconnect to a single cooling system exit channel.

Aspects of the above cooling system further comprise: a housing configured to receive at least a portion of the inverter, the first motor, and the second motor, wherein the first and second electric motors are arranged side-by-side in the housing and the inverter is arranged adjacent to each of the first and second electric motors, wherein the first and second cooling channels are disposed within a first portion of the housing and the first and second motor cooling channels are disposed in a second portion of the housing, and wherein the single cooling system exit channel is disposed at least partially in the housing. Aspects of the above cooling system include wherein the interconnection between the first outlet and the first motor cooling channel is adjacent to a first face of the first electric motor, wherein the interconnection between the second outlet and the second motor cooling channel is adjacent to a first face of the second electric motor, wherein the first motor cooling channel follows the length of the first electric motor in a direction toward a second opposite face of the first electric motor, wherein the second motor cooling channel follows the length of the second electric motor in a direction toward a second opposite face of the second electric motor. Aspects of the above cooling system include wherein the first motor cooling channel is arranged helically or any kind of meander around a body of the first motor, and wherein the second motor cooling channel is arranged helically or any kind of meander around a body of the second motor. Aspects of the above cooling system include wherein the first face of the first electric motor is coplanar with the second face of the second electric motor. Aspects of the above cooling system include wherein the single cooling system exit channel is disposed between the first and second electric motors. Aspects of the above cooling system include wherein the first area of the inverter and the second area of the inverter are disposed on opposite sides of a center of the inverter, and wherein the first outlet of the first cooling channel and the second outlet of the second cooling channel are disposed adjacent to opposite sides of the inverter. Aspects of the above cooling system include wherein the first cooling channel and the first motor cooling channel are formed as a first continuous channel in the housing, wherein the second cooling channel and the second motor cooling channel are formed as a second continuous channel in the housing. Aspects of the above cooling system include wherein a cross-sectional area of the first and second motor cooling channels each have a cross-sectional area that is less than a cross-sectional area of the single cooling system exit channel.

Embodiments include a split-flow cooling system, comprising: a housing; a first cooling stage disposed at least partially in the housing, comprising: a single cooling chamber configured to receive and convey coolant along a length of an inverter receptacle; a first cooling channel extending from the single cooling chamber in a first direction toward a first outer edge of the inverter receptacle; a second cooling channel extending from the single cooling chamber in a second direction toward an opposing second outer edge of the inverter receptacle, wherein the first cooling channel is configured to cool a first area of the inverter receptacle and the second cooling channel is configured to cool a different second area of the inverter receptacle; a second cooling stage disposed at least partially in the housing, comprising: a first motor cooling channel interconnected with the first cooling channel at a point adjacent to the first outer edge of the inverter receptacle, the first motor cooling channel configured to follow a length of a receptacle in the housing configured to receive a first electric motor; and a second motor cooling channel interconnected with the second cooling channel at a point adjacent to the second outer edge of the inverter receptacle, the second motor cooling channel configured to follow a length of a receptacle in the housing configured to receive a second electric motor, and wherein the first and second motor cooling channels interconnect to a single chamber exiting the housing.

Aspects of the above split-flow cooling system include wherein the receptacles in the housing configured to receive the first and second electric motors are disposed side-by-side, each receptacle being adjacent to the inverter receptacle. Aspects of the above split-flow cooling system include wherein the first motor cooling channel is arranged helically around the receptacle in the housing configured to receive the first electric motor, and wherein the second motor cooling channel is arranged helically or any kind of meander around the receptacle in the housing configured to receive the second electric motor. Aspects of the above split-flow cooling system include wherein a portion of the first cooling stage overlaps a portion of the second cooling stage. Aspects of the above split-flow cooling system include wherein the first direction is opposite the second direction. Aspects of the above split-flow cooling system include wherein the first cooling channel and the first motor cooling channel are formed as a first continuous cooling tube in the housing, wherein the second cooling channel and the second motor cooling channel are formed as a second continuous cooling tube in the housing. Aspects of the above split-flow cooling system include wherein the housing comprises a thermally conductive dielectric material overmolded onto the first and second continuous cooling tubes.

Embodiments include a cooling system, comprising: a thermal management system, comprising: coolant; an inlet configured to receive circulated coolant; an outlet configured to direct cooled coolant; a refrigeration unit configured to control a temperature of the coolant; and a coolant pump configured to direct the coolant and/or circulated coolant through the refrigeration unit and out of the thermal management system via the outlet; a split-flow coolant system, comprising: a housing; a single cooling chamber interconnected with the outlet of the thermal management system, the cooling chamber configured to convey coolant along a portion of an inverter receptacle; a first cooling channel extending from the single cooling chamber in a first direction toward a first outer edge of the inverter receptacle; a second cooling channel extending from the single cooling chamber in a second direction toward an opposing second outer edge of the inverter receptacle, wherein the first cooling channel is configured to cool a first area of the inverter receptacle and the second cooling channel is configured to cool a different second area of the inverter receptacle; a first motor cooling channel interconnected with the first cooling channel at a point adjacent to the first outer edge of the inverter receptacle, the first motor cooling channel configured to follow a length of a first electric motor receptacle in the housing; and a second motor cooling channel interconnected with the second cooling channel at a point adjacent to the second outer edge of the inverter receptacle, the second motor cooling channel configured to follow a length of a second electric motor receptacle in the housing, wherein the first and second motor cooling channels interconnect to a single combined exit chamber.

Aspects of the above cooling system further comprise: an inverter disposed at least partially within the inverter receptacle; a first electric motor disposed at least partially within the first electric motor receptacle in the housing; a second electric motor disposed at least partially within the second electric motor receptacle in the housing, wherein the first and second electric motors are disposed side-by-side in the housing. Aspects of the above cooling system include wherein the first motor cooling channel is arranged helically or any kind of meander around the first electric motor, and wherein the second motor cooling channel is arranged helically or any kind of meander around the second electric motor. Aspects of the above cooling system include wherein at least a portion of the coolant is directed, via the thermal management system, to flow from the outlet of the thermal management system to the single cooling chamber of the split-flow cooling system and split between separate first and second cooling channels adjacent to the inverter, and then continue through the motor cooling channels wrapped around each electric motor and then exit the housing via the single combined exit chamber, and return to the inlet of the thermal management system or other to be cooled components like battery, DCDC converters and the like for further processing.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity, e.g. by using a range extender unit. An electric vehicle generally includes a rechargeable electricity storage system (RESS)

(also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors or any kind of pressurized media such as air). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A cooling system, comprising:
   a cooling supply chamber disposed adjacent to and along a length of an inverter, the cooling supply chamber configured to receive coolant;
   a first cooling channel extending from and in fluid connection with the cooling supply chamber, the first cooling channel following a path arranged to cool a first area of the inverter;
   a second cooling channel extending from and in fluid connection with the cooling supply chamber, the second cooling channel following a path arranged to cool a different second area of the inverter, wherein the first cooling channel ends at a first outlet, and wherein the second cooling channel ends at a different second outlet;
   a first motor cooling channel interconnected with the first outlet of the first cooling channel, the first motor cooling channel configured to follow a length of a first electric motor; and
   a second motor cooling channel interconnected with the second outlet of the second cooling channel, the second motor cooling channel configured to follow a length of a second electric motor, wherein the first and second motor cooling channels interconnect to a single cooling system exit channel.

2. The cooling system of claim 1, further comprising:
   a housing configured to receive at least a portion of the inverter, the first motor, and the second motor, wherein the first and second electric motors are arranged side-by-side in the housing and the inverter is arranged adjacent to each of the first and second electric motors, wherein the first and second cooling channels are disposed within a first portion of the housing and the first and second motor cooling channels are disposed in a second portion of the housing, and wherein the single cooling system exit channel is disposed at least partially in the housing.

3. The cooling system of claim 2, wherein the interconnection between the first outlet and the first motor cooling channel is adjacent to a first face of the first electric motor, wherein the interconnection between the second outlet and the second motor cooling channel is adjacent to a first face of the second electric motor, wherein the first motor cooling channel follows the length of the first electric motor in a direction toward a second opposite face of the first electric motor, wherein the second motor cooling channel follows the length of the second electric motor in a direction toward a second opposite face of the second electric motor.

4. The cooling system of claim 3, wherein the first motor cooling channel is arranged helically or any kind of meander around a body of the first motor, and wherein the second motor cooling channel is arranged helically or any kind of meander around a body of the second motor.

5. The cooling system of claim 4, wherein the first face of the first electric motor is coplanar with the second face of the second electric motor.

6. The cooling system of claim 4, wherein the single cooling system exit channel is disposed between the first and second electric motors.

7. The cooling system of claim 4, wherein the first area of the inverter and the second area of the inverter are disposed on opposite sides of a center of the inverter, and wherein the first outlet of the first cooling channel and the second outlet of the second cooling channel are disposed adjacent to opposite sides of the inverter.

8. The cooling system of claim 4, wherein the first cooling channel and the first motor cooling channel are formed as a first continuous channel in the housing, wherein the second cooling channel and the second motor cooling channel are formed as a second continuous channel in the housing.

9. The cooling system of claim 4, wherein a cross-sectional area of the first and second motor cooling channels each have a cross-sectional area that is less than a cross-sectional area of the single cooling system exit channel.

10. A split-flow cooling system, comprising:
    a housing;
    a first cooling stage disposed at least partially in the housing, comprising:
       a single cooling chamber configured to receive and convey coolant along a length of an inverter receptacle;
       a first cooling channel extending from the single cooling chamber in a first direction toward a first outer edge of the inverter receptacle;
       a second cooling channel extending from the single cooling chamber in a second direction toward an opposing second outer edge of the inverter receptacle, wherein the first cooling channel is configured to cool a first area of the inverter receptacle and the second cooling channel is configured to cool a different second area of the inverter receptacle;
    a second cooling stage disposed at least partially in the housing, comprising:
       a first motor cooling channel interconnected with the first cooling channel at a point adjacent to the first outer edge of the inverter receptacle, the first motor cooling channel configured to follow a length of a receptacle in the housing configured to receive a first electric motor; and
       a second motor cooling channel interconnected with the second cooling channel at a point adjacent to the second outer edge of the inverter receptacle, the second motor cooling channel configured to follow a length of a receptacle in the housing configured to receive a second electric motor, and wherein the first and second motor cooling channels interconnect to a single chamber exiting the housing.

11. The split-flow cooling system of claim 10, wherein the receptacles in the housing configured to receive the first and second electric motors are disposed side-by-side, each receptacle being adjacent to the inverter receptacle.

12. The split-flow cooling system of claim 11, wherein the first motor cooling channel is arranged helically or any kind of meander around the receptacle in the housing configured to receive the first electric motor, and wherein the second motor cooling channel is arranged helically or any kind of meander around the receptacle in the housing configured to receive the second electric motor.

13. The split-flow cooling system of claim 12, wherein a portion of the first cooling stage overlaps a portion of the second cooling stage.

14. The split-flow cooling system of claim 12, wherein the first direction is opposite the second direction.

15. The split-flow cooling system of claim 12, wherein the first cooling channel and the first motor cooling channel are formed as a first continuous cooling tube in the housing, wherein the second cooling channel and the second motor cooling channel are formed as a second continuous cooling tube in the housing.

16. The split-flow cooling system of claim 15, wherein the housing comprises a thermally conductive dielectric material overmolded onto the first and second continuous cooling tubes.

17. A cooling system, comprising:
a thermal management system, comprising:
  coolant;
  an inlet configured to receive circulated coolant;
  an outlet configured to direct cooled coolant;
  a refrigeration unit configured to control a temperature of the coolant; and
  a coolant pump configured to direct the coolant and/or circulated coolant through the refrigeration unit and out of the thermal management system via the outlet;
a split-flow coolant system, comprising:
  a housing;
  a single cooling chamber interconnected with the outlet of the thermal management system, the cooling chamber configured to convey coolant along a portion of an inverter receptacle;
  a first cooling channel extending from the single cooling chamber in a first direction toward a first outer edge of the inverter receptacle;
  a second cooling channel extending from the single cooling chamber in a second direction toward an opposing second outer edge of the inverter receptacle, wherein the first cooling channel is configured to cool a first area of the inverter receptacle and the second cooling channel is configured to cool a different second area of the inverter receptacle;
  a first motor cooling channel interconnected with the first cooling channel at a point adjacent to the first outer edge of the inverter receptacle, the first motor cooling channel configured to follow a length of a first electric motor receptacle in the housing; and
  a second motor cooling channel interconnected with the second cooling channel at a point adjacent to the second outer edge of the inverter receptacle, the second motor cooling channel configured to follow a length of a second electric motor receptacle in the housing, wherein the first and second motor cooling channels interconnect to a single combined exit chamber.

18. The cooling system of claim 17, further comprising:
an inverter disposed at least partially within the inverter receptacle;
a first electric motor disposed at least partially within the first electric motor receptacle in the housing;
a second electric motor disposed at least partially within the second electric motor receptacle in the housing, wherein the first and second electric motors are disposed side-by-side in the housing.

19. The cooling system of claim 18, wherein the first motor cooling channel is arranged helically or any kind of meander around the first electric motor, and wherein the second motor cooling channel is arranged helically or any kind of meander around the second electric motor.

20. The cooling system of claim 19, wherein at least a portion of the coolant is directed, via the thermal management system, to flow from the outlet of the thermal management system to the single cooling chamber of the split-flow cooling system and split between separate first and second cooling channels adjacent to the inverter, and then continue through the motor cooling channels wrapped around each electric motor and then exit the housing via the single combined exit chamber, and return to the inlet of the thermal management system for further processing.

* * * * *